(12) United States Patent
Kislaki et al.

(10) Patent No.: US 10,380,516 B1
(45) Date of Patent: *Aug. 13, 2019

(54) CRM INCLUDING MULTI-THREAD MESSAGING

(71) Applicant: DIRECTLY SOFTWARE, INC., San Francisco, CA (US)

(72) Inventors: Ruben Kislaki, Reghin (RO); Vlad Georgescu, London (GB); Jeff Patterson, Pleasant Hill, CA (US); Stephen Hsu, San Francisco, CA (US); Tanausu Cerdeña, San Francisco, CA (US)

(73) Assignee: Directly Software, Inc., San Francisco, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/721,055

(22) Filed: Sep. 29, 2017

Related U.S. Application Data

(60) Provisional application No. 62/516,676, filed on Jun. 8, 2017, provisional application No. 62/471,305, filed on Mar. 14, 2017, provisional application No. 62/446,826, filed on Jan. 16, 2017.

(51) Int. Cl.
*G06Q 10/06* (2012.01)
*G06Q 30/00* (2012.01)

(52) U.S. Cl.
CPC ............... *G06Q 10/063112* (2013.01); *G06Q 10/063114* (2013.01); *G06Q 30/016* (2013.01)

(58) Field of Classification Search
CPC .......................... G06N 99/005; G06Q 30/016
USPC ............................... 379/265.01, 266.01, 309
See application file for complete search history.

(56) References Cited

U.S. PATENT DOCUMENTS

| 7,372,952 | B1 * | 5/2008 | Wu | ...................... | H04M 3/5233 370/352 |
| 2005/0002502 | A1 * | 1/2005 | Cloran | ............. | G06Q 10/06311 379/88.18 |

\* cited by examiner

*Primary Examiner* — Quynh H Nguyen
(74) *Attorney, Agent, or Firm* — Royse Law Firm, PC

(57) ABSTRACT

In a crowd sourcing approach, responses to customer service inquiries are provided by routing a subset of the inquiries to an independent group of experts. The customer service inquiries are optionally routed to specific experts based on matches between identified subject matter of the inquiries and expertise of the experts. Embodiments include methods of classifying customer service inquiries, training a machine learning system, and/or processing customer service inquiries. Multiple experts may provide responses to a particular customer service inquiry, optionally within a single chat window.

25 Claims, 8 Drawing Sheets

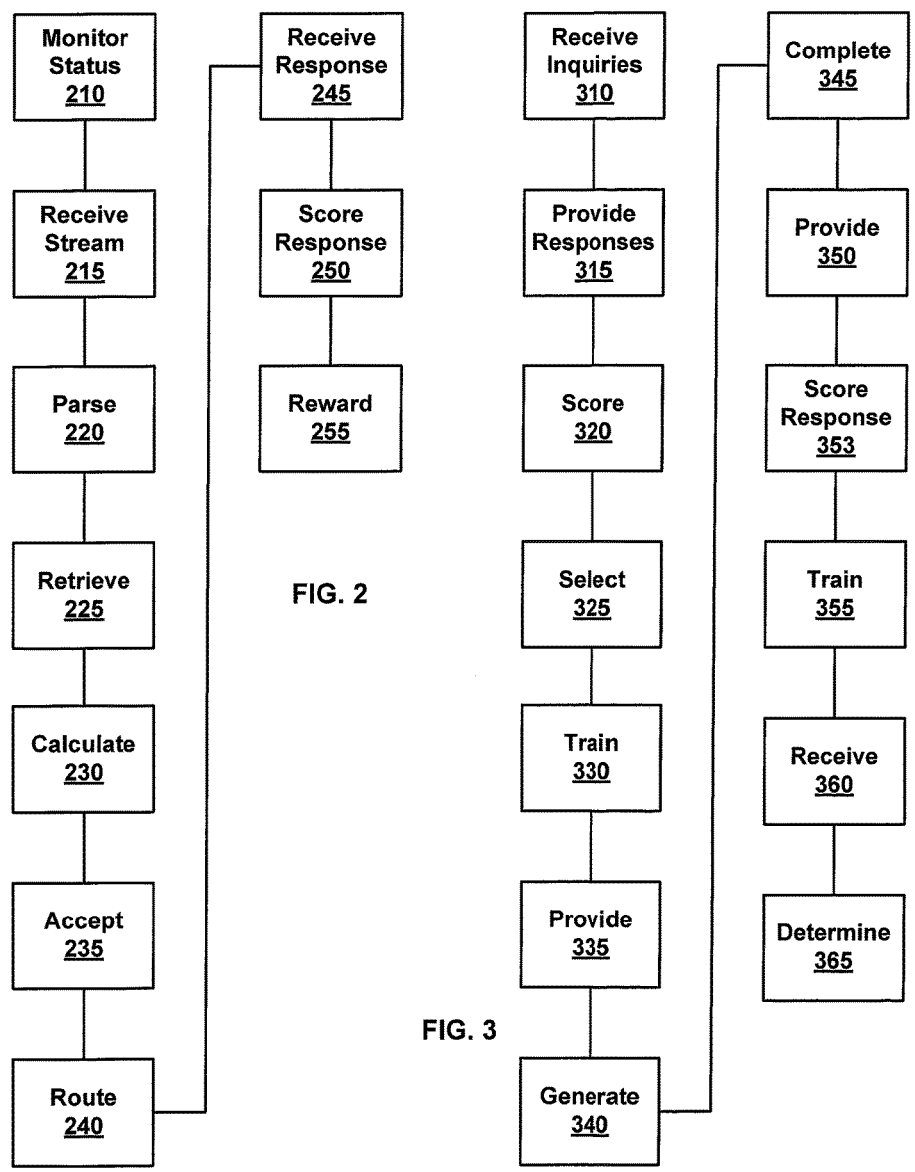

Customer: How do I configure an SSID

Expert A: Do you mean in the A300 Router?

Customer: Yes

AI: Open the configuration profile, select "New SSID," and enter a string of characters at least 8 letters long. Then select "Save."

Customer: How do I configure an SSID

Expert A: Open the configuration profile, select "New SSID," and enter a string of characters at least 8 letters long. Then select "Save."

Customer: Okay

Expert B: The configuration profile can be accessed by connecting your router to your computer using an Ethernet Cable and accessing IP address 0.0.1.1 in your browser.

Customer: How do I configure an SSID

AI: Open the configuration profile, select "New SSID," and enter a string of characters at least 8 letters long. Then select "Save."

Customer: Okay

Expert A: The configuration profile can be accessed by connecting your router to your computer using an Ethernet Cable and accessing IP address 0.0.1.1 in your browser.

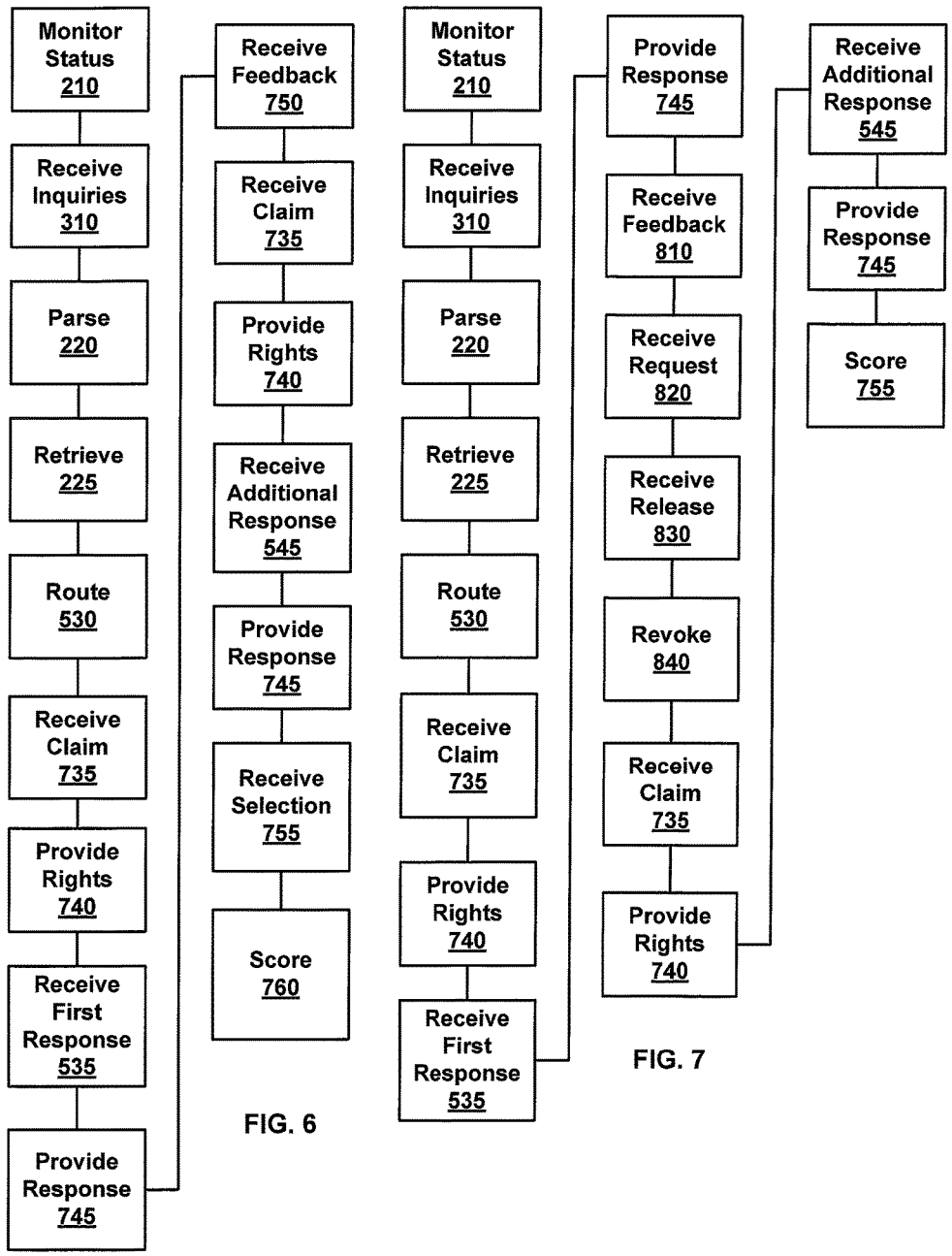

CRM INCLUDING MULTI-THREAD MESSAGING

CROSS-REFERENCE TO RELATED APPLICATIONS

This application claims benefit and priority to U.S. provisional patent application Ser. No. 62/516,676 filed Jun. 8, 2017; U.S. provisional patent application Ser. No. 62/446,826 filed Jan. 16, 2017, and U.S. provisional patent application Ser. No. 62/471,305 Filed Mar. 14, 2017;

this application is also related to U.S. patent application Ser. No. 15/138,166 filed Mar. 31, 2017, U.S. patent application Ser. No. 15/476,789 filed Mar. 31, 2017, U.S. patent application Ser. No. 15/138,166 filed Apr. 25, 2016 (now U.S. Pat. No. 9,654,640), U.S. patent application Ser. No. 14/619,012, filed Feb. 10, 2015 (now U.S. Pat. No. 9,325,849), U.S. provisional patent application Ser. No. 61/953,665 filed Mar. 14, 2014, U.S. provisional patent application Ser. No. 62/045,520 filed Sep. 3, 2014, U.S. patent application Ser. No. 15/488,411 filed Apr. 14, 2017, U.S. patent application Ser. No. 15/488,421 filed Apr. 14, 2017, and U.S. patent application Ser. No. 15/488,429 filed Apr. 14, 2017. All of the above provisional and non-provisional applications are hereby incorporated herein by reference.

BACKGROUND

Field of the Invention

The invention is in the field enterprise information management, and more specifically in the field of handling customer service inquiries, and/or other types of workflow activities.

Related Art

Typical customer service systems include a contact center configured to communicate with customers by voice, chat, video, text, e-mail, social media, and/or other channels. These systems often include a series of questions that are presented to a customer and configured to identify the customer's needs. For example, a customer calling to a contact center may be asked to enter numbers on their phone to route the call to a specific group of service personnel. The customer is typically placed in a queue and then transferred to the next available service person. Such contact centers are expensive to establish and maintain.

SUMMARY

Some embodiments of the current invention include systems and methods of providing improved customer service. These improved services are optionally achieved by processing and potentially resolving customer service inquiries prior to or after these inquiries have been routed to a contact center. The processing includes presenting the customer service inquiries to one or more "experts" And/or automated processing of the inquiries These experts may be independent persons having experience or qualifications in the subject of the customer service inquiry. Optionally, customer service inquiries that are not resolved by an expert are eventually forwarded to agents in an enterprise contact center or alternative agents.

Experts are managed by computing systems configured to determine which expert(s) should receive a particular customer service inquiry, to determine which experts are currently available, to manage rewards, to manage communications between experts and customers, and/or to generate expert scores. Customer service inquiries are routed by the computing systems to establish communication channels between the expert and source of the service inquiry. A customer service inquiry may be routed to more than one expert and/or automated response system, optionally in parallel. These computing systems are thus configured via specific computing instructions to produce a specific purpose computing system.

Various embodiments include an expert management system configured to manage customer service inquiries, the system comprising a request I/O configured to receive a customer service inquiry; an inquiry parser configured to determine one or more topic characteristics of the inquiry; status logic configured to monitor statuses of a plurality of experts; expert data storage configured to store data characterizing one or more specialty characteristics of each of the plurality of experts; routing data storage configured to store logs of inquiry routing; matching logic configured to match the inquiry to a first human expert of the plurality of human experts, the matching being based on the one or more expert score of the first human expert and a correlation between the topic characteristics of the inquiry and the specialty characteristics of the first human expert; scoring logic configured to generate the one or more expert score based on response ratings of responses provided by the first human expert; and routing logic configured to route the inquiry to the first human expert. The expert management system optionally further includes service interface logic configured for the first human expert to communicate with a source of the customer service inquiry; automated response logic configured to generate an automated response to the inquiry, the automated response being based on the topic characteristics of the inquiry and including a predetermined answer to the inquiry; reward logic configured to provide a reward to the first human expert as consideration for providing an answer to the customer service inquiry; and/or response log storage configured to store responses to the customer service inquiry, the stored responses being accessible to the plurality of human experts.

Various embodiments of the invention include an expert management system configured to manage customer service inquiries, the system comprising: a request I/O configured to receive a customer service inquiry from a customer; an inquiry parser configured to determine one or more topic characteristics of the inquiry; status logic configured to monitor statuses of a plurality of experts; expert data storage configured to store data characterizing one or more specialty characteristics of each of the plurality of experts; routing data storage configured to store logs of inquiry routing; matching logic configured to match the inquiry to a first human expert and a second human expert of the plurality of human experts, the matching being based on a correlation between the topic characteristics of the inquiry and the specialty characteristics of the first and second human experts; communication logic configured to manage communication between the customer and both the first and second human experts; and routing logic configured to route the inquiry to the first human expert.

Various embodiments of the invention include an expert management system configured to manage customer service inquiries, the system comprising: a request I/O configured to receive a customer service inquiry from a customer; an inquiry parser configured to determine one or more topic characteristics of the inquiry; status logic configured to monitor statuses of a plurality of experts; expert data storage configured to store data characterizing one or more specialty characteristics of each of the plurality of experts; optional routing data storage configured to store logs of inquiry routing; matching logic configured to match the inquiry to a first human expert of the plurality of human experts, the matching being based on a correlation between the topic characteristics of the inquiry and the specialty characteristics of the first and second human experts; automated response logic configured to provide at least part of a response without requiring further human intervention; communication logic configured to manage communication between the customer and the first human expert and also between the customer and the automated response logic; and routing logic configured to route the inquiry to the first human expert.

Various embodiments of the invention include a method of managing communication between a customer and more than one response source, the method comprising: receiving a customer service inquiry from the customer; parsing the customer service inquiry to determine a subject matter of the customer service inquiry; retrieving characteristics of at least one human expert; routing the customer service inquiry to a first response source; receiving a first response from the first response source; routing the customer service inquiry to a second response source; receiving a second response from the second response source; and providing the customer service inquiry, the first response and the second response to a same chat window, the chat window being visible to the customer.

BRIEF DESCRIPTION OF THE DRAWINGS

FIG. 2 illustrates a method of processing a customer service inquiry, according to various embodiments of the invention.

FIG. 3 illustrates a method of automatically processing a customer service inquiry, according to various embodiments of the invention.

FIGS. 5A-5D illustrate communication threads including a customer and multiple response sources, according to various embodiments of the invention.

FIG. 6 illustrates methods of managing communication between a customer and more than one human expert in a parallel mode, according to various embodiments of the invention.

FIG. 7 illustrates methods of managing communication between a customer and more than one human expert in a serial mode, according to various embodiments of the invention.

DETAILED DESCRIPTION

Figure 1:
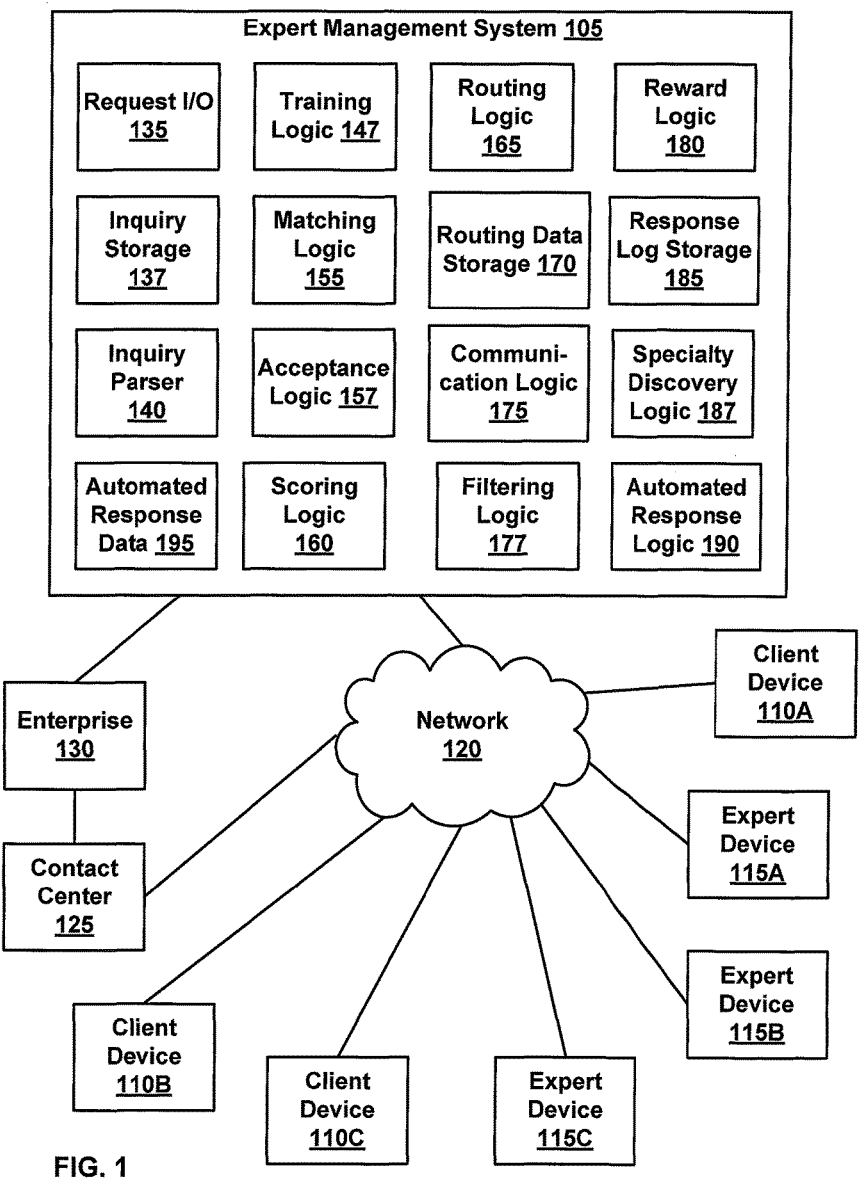
FIG. 1 illustrates a customer service architecture, according to various embodiments of the invention.

The systems and methods described herein are directed toward the resolution of customer service inquiries. For example, they may be used to generate one or more responses to a customer service inquiry. The customer service inquiry may be received directly from a customer or prospective customer ("a requester"). Alternatively, the customer service inquiry may be first communicated from a requester to a customer contact center (e.g., call center) and then forwarded from the contact center to the expert management systems described herein. The inquiries are resolved by first routing the inquiries to an expert management system and then, if needed, the inquiries are routed to a contact center. The routing is based on a rule set that is configured to reduce the number of inquiries received by the contact center while, at the same time, assuring minimum levels of response quality, response time, and/or customer satisfaction. These rules are optionally embodied in an expert system and/or trained artificial intelligence/neural network/machine learning system. Typically, resolving inquiries using the expert management system is more cost effective than having the inquiries resolved by the contact center. As used herein the term "machine learning system" is meant to include expert systems, artificial intelligence systems, artificial neural networks, Bayesian statistical processors, and/or the like.

While a contact center is typically managed or under contract with a specific enterprise, experts managed by the expert management system can be independent persons having expertise in one or more topics. For example, an expert in a cellular telephone service may be an experienced user or a current/former employee of a telephone company. The plurality of experts forms a support and/or service community having a diverse range of expertise. Communication with experts may be via the internet and/or other communication service. For example, an expert may provide customer service via a personal computer, tablet computer, or cellular telephone. Communication between a requester and an expert can be via telephone, voice over Internet Protocol (VoIP), text session, video, e-mail, chat, Facetime®, mobile application, etc. Both requesters and experts are examples of "users" of the system.

Experts may be compensated via a variety of methods. In some embodiments, a person making the inquiry for service posts a reward. In some embodiments, a tip is paid to the expert by the person making the inquiry after an answer is provided. In some embodiments, an enterprise pays or provides funds for paying experts to resolve service inquiries, optionally before the inquiries reach a contact center. For example, a utility company may designate funds to be paid to experts that prevent calls from reaching the utility company's contact center, or paid to experts for working on inquiries initially submitted to the contact center.

Certain terms are defined herein to have specific meanings. As these terms are used herein in the specification and claims, these terms are meant to be inherently limited by the definitions provided. Specifically, as used herein:

A "customer service inquiry" is defined as a request for help, assistance, support or some other type of service. Customer service inquiries can include technical service, sales service, advice, reviews, geographic directions, assembly directions, customer service and/or the like. Customer service inquiries may originate from an individual or a business that wishes to know about, consumes or potentially consumes a product or service. Customer service inquiries are sometimes referred to herein as "service inquiries" or simply "inquiries" where the context is clearly referring to customer service inquiries. Inquiries may be requests for services or information.

A "requester" is a person or enterprise that submits a customer service inquiry using a communication device.

An "expert" is defined as a person that makes him or herself available to provide responses (e.g., answers) to customer service inquiries. Experts can have different specialty characteristics, which denote topics in which the expert has expertise. In some embodiments, experts may have different levels of certification. For example, a "certified expert" may be one that is acknowledged by an enterprise to have specialty characteristics in the activities of that enterprise. In one embodiment, an airline certifies outside experts as having specialty characteristics in the airline's reservation system. A certified expert may be certified on the basis of having passed a test such as a language test or a technical skill test, and/or on the basis of having completed specific training. These experts may be former employees of the airline and/or have been trained by the airline. An internal expert is an enterprise employee or some other person that is provided with access to customer and/or account information that is generally not public. For example, if an enterprise is a bank, then an internal expert may be a contractor to whom the bank has given access to selected customer account information.

A "contact center" is defined as a facility populated by service personnel consisting of employees of an enterprise or employees of contractors to the enterprise for the purpose of responding to customer service inquiries. Contact centers may support one or more specific enterprise and normally have a set number of service personnel available to answer service inquiries at any given time. Contact centers may communicate with requesters by phone, chat, text and/or e-mail. The service personnel of a contact center are directly or indirectly under the control of an enterprise that pays for the service personnel to answer service inquiries and control the contents of the answers provided. One example of a contact center is a traditional call center.

An "enterprise" is defined as a business or other organization that would normally receive customer service inquiries relating to products or services of the enterprise. Examples of enterprises include corporations, product and service companies, professional organizations, political organizations, unions, non-profits, and/or academic or scientific institutions. Enterprises may have their own contact centers or may contract contact center services from third parties. In either case, the enterprises typically have control over the activities over contact center personnel. For example, the Enterprise will define answers to be given to specific questions.

An "answer" is the content of a response to a customer service inquiry and is intended to resolve the inquiry, ask for explanation or further details of the inquiry, and/or provide the requester with options relating to resolution of the inquiry.

FIG. 1 illustrates a Customer Service Architecture 100, according to various embodiments of the invention. Customer Service Architecture 100 includes an Expert Management System 105 configured to communicate with a plurality of Client Devices 110 and a plurality of Expert Devices 115 via a Network 120. Client Devices 110 and Expert Devices 115 are individually referenced as A, B, C, etc. The numbers of Client Devices 110 and Expert Devices 115 illustrated in FIG. 1 are for illustrative purposes; typically Customer Service Architecture 100 is configured to service much larger numbers of Client Devices 110 and Expert Devices 115. Expert Management System 105 is optionally further configured to communicate with a Contact Center 125 and/or an Enterprise 130. These communications are optionally via Network 120.

Client Devices 110 are the communication devices of a person sending a customer service inquiry. These communication devices can include, for example, a personal computer, a telephone, a cellular telephone, a tablet computer, a vending device, an interactive advertisement, a terminal, a point of sale system, a kiosk, and/or the like. Client Devices 110 enable communication modes such as voice, text, e-mail, video, MMS (multi-media messaging), and/or the like. Client Devices 110 are optionally configured to communicate through a web browser. Client Devices 110 optionally include an application specifically configured for communicating with Expert Management System 105 and/or Contact Center 125.

Expert Devices 115 are the communication devices of experts. Expert Devices 115 can include the same types of devices as discussed herein with respect to Client Devices 110. In some embodiments, an expert may have a plurality of different devices the expert uses to response to customer service inquiries. For example, one expert may use a personal computer, a tablet computer and a cellular phone to communicate with Clients 110 and/or Expert Management System 105. Expert Devices 115 optionally use a browser or custom application for this communication.

Network 120 is a communication network such as the internet, a wide area network, a cellular network, a telephone network (POTS), a satellite network, a cable network, and/or the like. Network 120 may include wired and wireless segments.

Expert Management System 105 includes a Request I/O 135 configured to receive customer service inquiries and communicate with Contact Center 125, Client Devices 110 and Expert Devices 115. Request I/O 135 may include a plurality of different devices, such as routers, firewalls, Ethernet ports, gatekeepers, switches, and/or the like. Request I/O 135 is configured to communicate via Network 120 and is typically configured to communicate via TCP/IP protocols. Request I/O 135 is optionally configured to communicate over a secure (e.g., encrypted) communication channel. The customer support inquires received via Request I/O 135 may be received at a data warehouse from an ETL (Extract, Transform and Load) process, or alternatively received from a customer support export queue of Call Center 125.

Expert Management System 105 optionally further includes an Inquiry Storage 137. Inquiry Storage 137 includes memory such as RAM, SRAM, a hard drive, flash memory, an optical drive, etc. Inquiry Storage 137 optionally further includes data structures specifically configured to store customer support inquires. This data structure may be part of a database and/or data warehouse.

Expert Management System 105 further includes an Inquiry Parser 140 configured to parse received customer service inquiries. Inquiry Parser 140 includes computer implemented logic configured to automatically parse each customer service inquiry and determine one or more topic characteristics of the inquiry, without human analysis. Inquiry Parser 140 includes hardware, firmware and/or software stored on a non-transient computer readable medium. Topic characteristics are characteristics of the service inquiry that are indicative of the topic(s) of the service inquiry. For example, topic characteristics may include information regarding a source of the service inquiry, metadata characterizing text within the service inquiry, account information, keywords within the service inquiry, and/or the like. Examples of topic characteristics include questions regarding specific software or hardware, business services, reservations, bill payment, account services, how to do something, medical questions, installation procedures, advice, appointments, professional recommendations, etc.

In some embodiments, Inquiry Parser 140 is configured to identify a source of the customer service inquiry and to infer topic characteristics of the service inquiry based on the identity of the source. For example, if a service inquiry arises from a member of Client Devices 110 that includes a kiosk in a retail store of a cellular telephone company, then Inquiry Parser 140 can infer that the topic of the customer service inquiry is related to the cellular telephone company. In another example, if the customer service inquiry is received from a webpage hosted by an electronics retailer, then Inquiry Parser 140 can infer that the topic of the customer service inquiry is related to the products of the electronics retailer, or to a specific product displayed on the webpage. In some embodiments, Inquiry Parser 140 is configured to use a location of a member of Client Devices 110 as a topic characteristic. For example, if the customer service inquiry is received from Client Device 110A while Client Device 110A is located at a national park, then Inquiry Parser 140 can infer that the topic of the inquiry related to that park. Inquiry Parser 140 is optionally configured to use a universal resource locator (URL), internet domain, account, browser type, application type, and/or similar information regarding the customer service inquiry. For example, Inquiry Parser 140 may use the identity of a web page or mobile application from which a customer service inquiry was received to select a natural language processing lexicon to be used in identifying topic characteristics of the inquiry.

Inquiry Parser 140 optionally includes a natural language processing engine to determine one or more topic characteristics of a customer service inquiry. A lexicon used by the natural language processing engine may be selected based on a source of the customer service inquiry. The natural language processing engine is optionally configured to detect and interpret phrases as well as key words and phrases that pertain to the industry (i.e., "wireless"), company (i.e., "Verizon"), location (i.e., "California"), topic (i.e., "Downloading music"), device (i.e., "iPhone"), etc.

In some embodiments, Inquiry Parser 140 is configured to identify metadata within a customer service inquiry and to assign particular meaning to data tagged by the metadata. For example, if the customer service inquiry is generated in Client Device 110B using a browser, the inquiry may include data entered in specific fields of a webpage configured to receive keywords such as model number, brands, serial numbers, topic identifiers, account numbers, login data, etc. The inquiry may include data characterizing a customer profile, a device type of Client Device 110G, a browser identity, an operating system identity, a source Universal Resource Locator (URL), a source Internet Protocol (IP) address, a source MAC address, a password, a security token or certificate, and/or the like.

The location of an expert may be considered in determining if an expert is available to respond to a specific inquiry, when a specific location facilitates responding to the inquiry. For example, if a customer wishes advice on places to visit within a city the inquiry may specify an expert local to the city. The language of an expert may be considered in determining if an expert is available to respond to a specific inquiry. For example, an inquiry may require communication in a specific language or translation between languages.

In some embodiments, Expert Management System 105 is configured to receive and store an availability schedule from an expert. The availability schedule includes time during which the expert is available, unavailable and/or on standby. The condition of standby indicates that the expert is not currently available but could become available upon request. For example, an expert may be may be moved from a standby state to an available state in response to real-time demand. The change in state optionally includes sending a message to a device of the expert, e.g., Expert Device 115A, asking that the expert make ready to respond to inquiries in real-time. As demand changes, the expert may be placed back on standby. Such changes are may be on a relatively short time scale, e.g., less than 10, 30 or 60 minutes, and are optionally not associated with a traditional multi-hour work shift. This allows the system to respond to changes in demand in real-time. In one illustrative example, an airline stewardess trained in reservations may be moved from a standby to an available status for a short time between flights, in response to a high demand. Moving from standby to active optionally includes moving the expert from a queue of experts on standby.

In typical embodiments, an expert is assigned one or more scores. Expert scores are based on one or more of the following: a) time taken to provide an initial response to customer service inquiries, b) time taken to resolve customer service inquiries, c) feedback from requesters of customer service inquiries, d) ratings by fellow experts, and e) cooperation with fellow experts. For example, in some embodiments, a person making a customer service inquiry is asked to rate the quality of the response received from a particular expert. The quality can include factors such as speed of response, helpfulness, etc. In some embodiments, a fraction of responses to customer service inquiries made by an expert are sent to fellow experts for their review of the quality of the responses. The score of an expert can be based on both requester and fellow expert ratings.

Cooperation with fellow experts includes working with fellow experts to respond to a customer service inquiry, and referring customer service inquiries to other experts. A single customer service inquiry may be resolved by more than one expert in cooperation. For example, a problem involving a computer and a software application may be cooperatively solved by an expert having expertise on the computer and an expert having expertise on the software application. A first expert may refer a customer service inquiry to a second expert if the inquiry would be better resolved by the second expert. For example, if a first expert on airline reservations receives a customer service inquiry that would be better handled by a second expert on frequent flyer programs, then the first expert may forward the inquiry to the second expert. If, as optionally determined by the second expert, the forwarding was appropriate; the first expert may be rewarded by an improvement in expert score.

An expert score may include a general component and a component that is specific to different topics. Thus, and expert might have a better score in one topic relative to another topic. An expert may have a high score in motorcycle maintenance and a low score in computer networking.

In some embodiments experts are classified, e.g. as "internal experts" and "external experts." Generally, an internal expert is an expert that is under the control of an organization such as Enterprise 130. Examples of internal experts include call center (e.g., Contact Center 125) staff, retired employees, off-duty employees, and/or the like. Generally, an external expert is an expert that is not under direct control of the organization. An external expert may be compensated based on posted rewards, which may be specific to a particular customer service inquiry. In contrast internal experts are more likely to be compensated at a fixed rate ($/answer or $/hr). Thus, internal and external experts may receive different rewards for answering a customer service inquiry.

Typically, internal experts are authorized to receive a greater amount of customer information relative to external experts. For example, internal experts may be authorized to access confidential financial data, account numbers, social security numbers, medical information, order history, customer data (telephone number, address, name, etc.), and/or the like, while external experts are not thus authorized. Internal experts may also be authorized to take actions for which external experts are not authorized. For example, an internal expert may be authorized to give a customer credit, to authorize a payment, to make a reservation, to accept an order, to electronically access a customer's device, and/or the like. The classification of experts need not be binary. For example, there can be multiple levels of expert authorization and/or capabilities. The authorization of an expert may be specified by an organization (e.g., Enterprise 130) to whom a customer service inquiry is directed, or may be specified by a third party certification process. Such authorization may be made based on training and/or certification of the expert.

Expert Management System 105 further includes Matching Logic 155 configured to match customer service inquiries to human experts. The matching is optionally based on at least a score of one of the human experts and a correlation between the topic characteristics of the inquiry (e.g., as determined by Inquiry Parser 140) and the specialty characteristics of the human expert. The expert score considered in matching is optionally specific to the topic characteristics and of the inquiry. For example, an expert may have a plurality of scores associated with different topics of customer service inquiries, e.g., relatively higher scores related to computer networking as compared to spider identification. As such, the matching performed by Matching Logic 115 can be dependent on assignment of customer service inquires to particular topics. Expert Management System 105 is optionally further configured to match inquiries and experts based on the availability of the experts. For example, if a customer service inquiry is to be resolved in real-time, then only those experts currently available are considered for matching. Matching Logic 155 may be configured to match inquiries to internal and/or external experts.

Matching Logic 155 is optionally configured to match a plurality of experts to a customer service inquiry. These experts may be ranked, for example, in order from best match to less favorable match. As is described further elsewhere herein, the customer service inquiry may be initially offered to the first ranked expert, and if not resolved later offered to a second ranked expert. In some embodiments, a requester can choose between two or more matched experts, or can select a plurality of experts to answer an inquiry in parallel.

In various embodiments, Matching Logic 155 is configured to match the inquiry based on a request for a specific human expert (e.g., an expert used by the requester in the past), to match based on a topic characteristic identified by a second human expert, and/or to match based on a referral by a second human expert. In some embodiments, Matching Logic 155 is configured to match the customer service inquiry to a second human expert based on an unsatisfactory answer received from the first human expert. In some embodiments, Matching Logic 155 is configured to match the inquiry to internal or certified experts from different third parties in parallel (e.g., based on two or more different topics characteristics of the customer service inquiry matching complementary specialty characteristics of the experts).

Expert Management System 105 further includes Scoring Logic 160 configured to calculate expert scores and to associate these scores with the corresponding experts. As discussed elsewhere herein, scores are based, for example, on the historical performance of an expert. Typically, the data used to calculate the score for an expert include both feedback from other experts and feedback from customers whose customer service inquiries have been handled by the expert. Scores may be specific to specific topics. As such one expert may have several different expert scores for different topics (specialty characteristics). Scores are optionally further calculated based on certification and/or official status of an expert. In some embodiments, Scoring Logic 160 is configured to calculate scores for groups of experts, such as expert teams. Scores are optionally further based on an automated analysis of an expert's answer. An automatically generated score may be based on technical content of an answer in addition to tone take by the expert (e.g., politeness), grammar of an answer, language used, and/or the like.

Expert Management System 105 further includes Routing Logic 165 configured to route customer service inquiries to experts matched to the inquiries by Matching Logic 155. In some embodiments, Routing Logic 165 is configured to route the customer service inquiry to one of Expert Devices 115 and then further communication related to resolution of the inquiry occurs directly between the one of Expert Devices 115 and the originating member of Client Devices 105 (e.g., the member of Client Devices from which the inquiry originated). In some embodiments, Routing Logic 165 is configured to route the customer service inquiry to one of Expert Devices 155 and then route a response from the one of Expert Devices 115 back to the originating member of Client Devices 105. In these embodiments, Routing Logic 165 may route multiple communications between these devices to resolve a customer service inquiry. Routing Logic 165 optionally includes all or part of Matching Logic 155.

In various embodiments, Routing Logic 165 is configured to route customer service inquiries to more than one expert (associated with more than one of Expert Devices 115). This can occur in various ways. For example, a customer service inquiry may be routed to different experts in a serial manner if a first expert, or set of experts, is unable to provide a satisfactory resolution for a customer service inquiry. The lack of a satisfactory resolution may be determined by the originator of the inquiry (requester), by other experts, and/or by an elapsed time. A customer service inquiry may be routed to different experts in a serial manner if a first expert (or set of experts) refers the inquiry to a second expert. The second expert may take over responsibility for resolving the inquiry alone, or may work with the first expert to jointly resolve the inquiry. In one example, a response(s) produced by one set of experts may be given to a second set of experts for rating or to provide further input. Optionally, separate responses to an inquiry are provided by different sets (e.g., teams or groups) of experts.

In various embodiments, Routing Logic 165 is configured to route a customer service inquiry to more than one expert in parallel. As used herein, "parallel" routing means that the customer service inquiry is sent to a second expert without regard to whether a response (to the same inquiry) has been received from a first expert. This approach is optionally used to assure that at least one expert responds to the inquiry in a timely manner, that more than one response is produced, and/or that multiple experts have an opportunity to "claim" the inquiry. For example, a customer service inquiry may be routed in parallel to several different experts identified by Matching Logic 155. The expert that responds first to the inquiry is then optionally assigned responsibility for responding to the inquiry, and the opportunity to respond to the inquiry is then typically withdrawn from other experts. In some embodiments, multiple customer service inquiries are sent to one expert and the expert has the opportunity to select which one he or she is best suited to respond to. In some embodiments, an inquiry is presented to multiple experts in parallel and one or more of these experts can respond to the inquiry. The multiple experts may be notified of more than one inquiry in parallel and each of the experts can then choose which one (or more) of the inquiries to respond to.

Routing Logic 165 is optionally configured to route customer service inquiries to Contact Center 125. This can occur, for example, if an expert refers the service inquiry to Contact Center 125, if an expert is unable to resolve an inquiry to a requester's satisfaction, if an inquiry is not resolved within a predetermined time period, if no expert having needed specialty characteristics is available, if topic characteristics of the inquiry require confidential account data not available to experts, and/or the like. In some embodiments, Routing Logic 165 is configured to route a customer service inquiry to Contact Center 125 if Enterprise 130 reports that there are currently unused service personnel at Contact Center 125. For example, if Enterprise 130 has an instance of Contact Center 125 including 30 service personnel that represent a sunk cost, then Enterprise 130 may wish to use these personnel rather than pay a cost of having the customer service inquiry sent to one of Expert Devices 115. Likewise, Routing Logic 165 may be configured to avoid routing customer service inquiries to Contact Center 125 at time that Enterprise 130 reports that no contact center service personnel are available. Routing Logic 165 may be configured to avoid routing customer service inquiries to Contact Center 125 that are originally received from requestors via Contact Center 125.

In some embodiments, Routing Logic 165 (or Matching Logic 155) is configured to consider a customer service inquiry (including content, requester profile, requester activity, expert activity, etc.) and three possible resource types to resolve the inquiry. The resource types can include 1) Automated answers, external experts and internal experts. Routing Logic 165 or Matching Logic 155 is optionally configured to determine which types are most useful/efficiently used. This determination can rely on either binary rules: i.e., don't use community members for password questions, don't use automated responses if the questions has high emotional context; or by probabilistic rules: i.e. use an automated response if confidence >90%, or use a community member (external expert) if they've successfully answered over 50% of questions that look like this. The resources used to resolve a customer service inquiry can include more than one resource type. For example, all three types of resources may be used serially or in parallel. As is discussed elsewhere herein, the three types of resources may use a common communication channel and/or user interface.

In some embodiments, the ability of an expert to resolve a customer service inquiry can be determined by the requester and/or the expert. A requester may indicate that he or she is unsatisfied with a response provided by an expert and ask that the customer service inquiry be forwarded to Contact Center 125. An expert may determine that he or she is unable to properly respond to a customer service inquiry. The inability to properly respond may be, for example, because the inquiry has been improperly or incompletely characterized by Inquiry Parser 140, because the expert is not qualified, because confidential information (e.g., account access) is required, and/or because there is no resolution to the inquiry. In various embodiments, if an expert is unable to respond to an inquiry the requester may forward the inquiry to Contact Center 125 and/or to another requester. In some embodiments, Routing Logic 165 is configured to automatically send a customer service inquiry to an internal expert if an external expert is unable to provide an adequate answer to the inquiry.

In some embodiments, Routing Logic 165 is configured to prevent routing of customer service inquires including confidential information to external experts. For example, inquires including an account number, social security number, telephone number, or any of the other personal/private information discussed herein, are optionally always routed to an internal expert. Inquiry Parser 140 is optionally configured to identify which customer service inquiries are likely to require the use of confidential information and Routing Logic 165 can then route those inquires to internal experts. For example, an inquiry that requests a change in mailing address or customer authentication may be directed to internal experts rather than external experts.

In some embodiments, Routing Logic 165 is configured to give priority to internal experts and then to route customer service inquiries to external experts when no internal experts are available. Matching Logic 155 may select specific internal and external experts, for routing an inquiry, using the same or different criteria.

In some embodiments, Matching Logic 155 is configured to match customer services requests an Automated Response Logic 190. Automated Response Logic 190 is configured to provide at least part of a response without further human intervention, e.g. to provide an "automated response." Automated Response Logic 190 is discussed elsewhere herein. Customer service inquiries may be routed to Automated Response Logic 190 in series or in parallel to internal and/or external experts. Once matched to Automated Response Logic 190, inquires can be routed to Automated Response Logic 190 by Routing Logic 165.

Matching Logic 155 may be configured to match a customer service inquiry to Automated Response Logic 190 based on availability of internal experts, availability of external experts, an estimate that the Automated Response Logic 190 can contribute to a helpful response, and/or the like. For example, a lack of internal and/or external experts may increase the likelihood that a particular customer service inquiry is matched and subsequently routed to Automated Response Logic 190. As with matching to particular internal and/or external experts, matching to Automated Response Logic 190 can also be based on one or more topic characteristics of the customer service inquiry, optionally as determined by Inquiry Parser 140.

Matching Logic 155 and/or Routing Logic 165 optionally includes a machine learning system, e.g., a neural network or artificial intelligence system, configured to match and/or route customer service inquiries. As used herein, "machine learning system" is meant to include actual machine learning systems and/or other types of Bayesian/neural network/artificial intelligence systems. The machine learning system can include hardware, firmware, and/or software stored on a computer readable medium, and is optionally configured to be trained using training data to produce desired functionality. These requests may be routed to internal experts, external experts, automatic response systems (e.g., Automated Response Logic 190), or any combination thereof. A trained machine learning system may include parts specific to a particular Enterprise 130, parts specific to particular request topics, and/or more general parts. The machine learning system may be trained to receive contents of (and/or metadata associated with) a customer service inquiry and to determine if Automated Response Logic 190 should receive the request. The machine learning system may output an estimated response score, a Boolean determination, a probability, the identity of a preferred Automated Response Logic 190, and/or the like.

Expert Management System 105 further includes a Routing Data Storage 170 configured to store logs of inquiry routing. Routing Data Storage 170 includes non-transitory memory specifically configured to store information relating to current and/or past routing. The memory is thus configured via data and file structures. For example, Routing Data Storage 170 can include an expert relational database in which data structures are defined to store routing data. The stored routing data includes information such as which Expert Devices 115 received customer service inquiries from which Client Devices 110, how many inquiries were routed, the source and destination of any answers to these inquiries, how many answers were routed, which experts forwarded inquiries, where the inquiries were forwarded to, and/or the like. In some embodiments, routing data storage is configured to store logs of customer service inquiries that were routed to more than one human expert (in parallel and/or serially) and/or inquiries that were routed to Contact Center 125.

In some embodiments, content from Automated Response Logic 190, internal experts, and/or external experts is presented to customers within a first chat window on Client Device 110A, and/or also within a second chat window on Expert Device 115A (used by an external expert, and/or also on Expert Device 115B (used by an internal expert). In these cases, Filtering Logic 117 may be configured to selectively filter the content presented on the different devices. For example, the most personal information, such as social security numbers, may only be seen by the customer, and personal information such as account balances and personal address may only be seen by the customer and internal expert. Filtering logic can remove personal private information from a version of the multi-party conversation seen by the external expert and/or internal expert.

In some embodiments, Expert Management System 105 further includes Communication Logic 175 configured to manage communications between a customer and more than one response source. Communication Logic 175 includes hardware, firmware, and/or software stored on a non-transient computer readable medium. The more than one response source can include multiple human experts (2, 3 or more) and/or automated response sources such as Automated Response Logic 190 (discussed elsewhere herein). For example, Communication Logic 175 may be configured to manage a chat in which the customer can interact with two or more human experts in parallel, e.g., receive text from both human experts in the same chat channel/session/window. Likewise, Communication Logic 175 may be configured to manage a chat in which the customer can interact with two or more human experts serially, e.g., one after another optionally in different windows. Further, Communication Logic 175 may be configured to manage a group chat in which the customer can interact with an automated response source and one or more human experts, either serially or in parallel.

In some embodiments Communication Logic 175 is configured to manage a joint chat window in which a customer can interact with more than one response source. Communication Logic 175 may accomplish this by aggregating text received from the response sources, labeling each source (e.g., providing a name), and presenting the text in a chat window which can be viewed by the customer and those response sources that include human experts. The chat window is optionally spawned to form daughter chat windows under the control of one or more of the human experts. For example, a customer support inquiry that includes both hardware and software issues may be resolved using a single chat window in which both a software expert and a hardware expert contribute responses. Alternatively, the software and hardware issues may be resolved in separate chat windows, which include responses by the software and hardware experts, respectively. The separate chat windows, if independent, may be considered separate chat sessions or may be considered part of the same chat session if the chat windows remain connected by the passing of data, commands or control there between.

In some embodiments, Communication Logic 175 is further configured for a first human expert to add a second human expert to a communication (e.g., chat) session. For example, a customer service inquiry may turn out to require expertise other than that held by the first human expert. In a specific illustration, a customer service inquiry that initially appeared to involve changing an airline reservation may evolve to require resolution of a billing question. In this case, a first human expert that is expert at reservations may wish to include a second human expert with expertise in billing. The first human expert may request a specific second expert from a list of available experts, or may request that Routing Logic 165 connect a human expert with the desired expertise and route the chat session to that expert. The second human expert can respond to the customer service inquiry and/or the response(s) by the first human expert. Routing Logic 165 and/or Matching Logic 155 are optionally configured to use text from a customer and/or one or more experts in a chat session to identify the second human expert. Thus, the selection of additional human experts may be based not only on an original customer service inquiry but also on communications from multiple parties, e.g. as found in a chat session, related to that customer service inquiry.

In some embodiments, a second human expert may be added to a chat session without a specific request from a first human expert. For example, a supervisor, an authorized expert, and/or an agent at Contact Center 125 may monitor a chat session involving the first human expert. This party may wish to add their own input to the chat session to supplement or correct content (e.g., text or images) provided to the chat session by the first human expert.

In some embodiments, Communication Logic 175 is further configured for a first human expert to add an automated response source to a communication session. The first human expert can choose between a) providing a manual response and b) providing an automated response, to the customer service inquiry. A manual response being one that is manually selected or typed by the human expert. For example, a customer and human expert may first communicate regarding a customer service inquiry. The human expert can then request that Automated Response Logic 190 provide an additional response to the customer service inquiry. This may occur, for example, when the initial customer service inquiry does not have sufficient information for an automated response. The human expert can clarify the needs of the customer and then allow an automated response system to provide the detailed information needed. Likewise, when the response requires confidential information not available to the human expert, the human expert can designate that an automated response source provide this information to the customer via the original chat window or a private chat window, e.g., a chat window that is private to the customer and the automated response source.

In some embodiments, Communication Logic 175 is further configured for a first human expert to add to a communication session that was originally between a customer and an automated response source. For example, a customer service inquiry may originally be routed by Routing Logic 165 to Automated Response Logic 190. If an initial response provided by Automated Response Logic 190 does not appear to resolve the customer service inquiry, Routing Logic 165 and/or Matching Logic 155 may be configured to identify a human expert to participate in the chat session that originally included the customer and Automated Response Logic 190. The human expert can then respond to the customer service inquiry and/or the response provided by the automated response source. The failure of the automated response may be judged by the customer or Automated Response Logic 190. For example, Automated Response Logic 190 may be configured to defer to a human expert based on a calculation that an automated response has an insufficient probability to resolve the customer service inquiry. The calculation may be based on not just the original customer service inquiry, but also text provided in the chat session by either the customer or Automated Response Logic 190.

When a new response source is added to a chat session, the new response source is optionally provided with a history of the chat session. For example, Communication Logic 175 is optionally configured to present to a human expert (added to a chat) text that has previously been communicated as part of the chat session. Further, Communication Logic 175 is optionally configured to provide a history of a chat session to Automated Response Logic 190. As discussed further elsewhere herein Automated Response Logic 190 may use text contributed by a human expert in a chat session to select and/or generate automated responses to a customer service inquiry.

Human experts participating in a group chat session can include any combination of internal experts, external experts and certified experts. Typically, Communication Logic 175 is configured such that a first human expert can observe contributions to the chat session between the customer and a second human expert or an automated response system. However, in some embodiments, Communication Logic 175 is configured to send different views of a chat to different response sources. For example, confidential information may be removed or redacted from some views using Filtering Logic 177, discussed further elsewhere herein. Alternatively, confidential information may be communicated in a related (daughter) chat window/session that is not available to one of the parties of the original chat session.

Scoring Logic 160 is optionally configured to generate a separate score for each response source that takes part in a group chat. For example, separate scores may be generated for each human expert and/or each Automated Response Logic 190 that participates in providing a response to a customer service inquiry. Further, Scoring Logic 160 may be configured to generate a joint score based on responses of multiple human experts and/or automated response sources, which participate in responding to a particular customer service inquiry. The joint score may represent the quality of responses provided in a shared chat window/session. The score may be based on feedback from a customer and/or other criteria as discussed elsewhere herein.

In some embodiments, Communication Logic 175 is configured to allow more than one human expert to communicate with the customer regarding the customer service inquiry, the addition of more human experts being based on a topic of the customer service inquiry. For example, an enterprise may determine that simple requests for account balance should be resolved by just one expert, but that more complicated customer service inquiries justify use of multiple human experts. Further, Communication Logic 175 is optionally configured to limit the number of human experts that can participate in a same chat session to respond to the customer service inquiry. For example, an enterprise may designate that no more than three experts should be allowed to participate in the same chat session.

In some embodiments Communication Logic 175 is configured for a human expert to "claim" a customer service inquiry. This claim indicates that the human expert intends to provide a response to the inquiry, and is optionally a request for an exclusive right to make the response—at least for a period of time. For example, Routing Logic 165 may be configured to provide the customer service inquiry to two or more human experts for consideration. The human experts may each then choose or not choose to claim the inquiry. If a claim is made then the human expert that claims the inquiry first may be given "response rights" to the inquiry. The response rights provide a right to contribute a response that will be provided to the customer, and optionally seen/reviewed by other human experts. The response rights may be exclusive, meaning that only the one human expert is given the right to respond. However, this exclusivity may be removed in a variety of designated circumstances, e.g., circumstances specified prior to receiving the customer service inquiry. The circumstances and/or results of removal are optionally dependent on whether Expert Management System 105 is configured to allow the human experts to respond the customer service inquiry in a parallel or serial mode.

The designated circumstances that may result in elimination of exclusive response rights given to a human expert can include, for example, receipt of a release from the human expert. The human expert may explicitly indicate that he is unable to complete a response, would like help from other experts, or has changed his mind regarding his desire to provide a response.

An exclusive right to respond may be revoked by Communication Logic 175. In various embodiments, this is in response to designated circumstances that include a customer request and/or to feedback regarding a response provided by the human expert. For example, a customer may specifically request that a human expert assigned to resolve an inquiry of the customer be replaced by a different human expert.

In some embodiments, right to respond may be revoked by Communication Logic 175 based on a time difference between receipt of two claims from different human experts. For example, if the claims to respond to an inquiry are received within 500 milliseconds the time difference may be considered a "tie." In a tie, both human experts are optionally given an opportunity to respond.

Feedback regarding a provided response may be positive or negative, and may come from a variety of sources. For example, in various embodiments a response to an inquiry provided by a first human expert may be voted up or down by other human experts, rated on a 5-star scale, and/or commented on. In some embodiments, negative feedback from a significant number (e.g., 1, 2, 5 or more) of sources may result in automatic revocation of exclusive rights to respond to the inquiry. Loss of exclusive rights may result from either positive or negative feedback.

Exclusive rights to respond to a request may also be automatically revoked if communication with a human expert is lost. The revoking of an exclusive response right and/or feedback associated therewith is optionally considered by Scoring Logic 160 in generating a score associated with a response and/or human expert.

Loss of exclusive rights to respond to a customer service inquiry may include loss of all rights to respond or may include merely loss of exclusivity. The consequences of the loss can be dependent on whether Expert Management System 105 is operating in a parallel or serial mode, and/or the circumstances under which the rights were lost.

In serial mode wherein only one human expert can provide a response at the same time, the loss of exclusive response rights almost always results in loss of all rights to respond to the inquiry. In this case, a claim to the customer service inquiry may be received from a second human expert and Communication Logic 175 may provide response rights to the second human expert in response. The second human expert may receive a copy of the communication made in the chat session and can optionally continue that session in a same chat window.

In a parallel mode, more than one human expert can provide responses to a specific customer service inquiry at the same time. In this case, Communication Logic 175 may be configured to include the responses in a same chat window or in separate chat windows. Further, in some embodiments the customer is presented with more than one response and is provided with an opportunity to select which of the 2, 3 or more responses is preferred. This selection is optionally used to provide scores to one or more of the responses.

Further details of the operation of Communication Logic 175 are discussed elsewhere herein, for example with respect to FIGS. 6-8. Communication Logic 175 may be configured for communication via text, audio, video, e-mail, and/or chat.

In some embodiments, Expert Management System 105 further comprises Filtering Logic 177. Filtering Logic 177 is configured to remove personal and/or confidential information from communications between Client Devices 110 (e.g., customers) and Expert Devices 115 (e.g., experts). In some embodiments Filtering Logic 117 is also configured to remove personal and/or confidential information from communication between Client Devices 110 and Contact Center 124, or between Expert Devices 115 and Contact Center 125. For example, Filtering Logic 177 may be configured to remove personal information from a customer service inquiry received by Request I/O. Filtering Logic 177 is configured to prevent experts from receiving or sending unauthorized information. Filtering Logic 177 includes hardware, firmware, and/or software stored on a non-transient computer readable medium.

Examples of information that can be removed by Filtering Logic 177 include a customer name, account balance, an account number, a credit line, a telephone number, an e-mail address, a social security number, a past due amount, a customer address, a password, an order history, a travel schedule, and/or the like. The removed information may be identified based on data stored in a customer database (not shown) within Enterprise 130 and/or Expert Management System 105. For example, when a customer using Client Device 110A is communicating with an expert using Expert Device 115A account information regarding the customer may be extracted from the customer database by Filtering Logic 177. The communication between Client Device 110A and Expert Device 115A is then parsed to identify specific personal and/or confidential information. In a specific case, Filtering Logic 177 is configured to detect the customer's password or account number in the communication and to remove (cut or mask) this information. This prevents the customer from sending their password to Expert Device 115A and/or prevents the expert from sending the customer's account number to Client Device 110A.

In some embodiments, Expert Management System 105 further comprises Reward Logic 180 configured to provide a reward an expert as consideration for providing one or more answers to a customer service inquiry. This reward is optionally a monetary reward and may be in a virtual currency. The reward is typically paid to an account of an expert. In some embodiments, the reward is specified by Enterprise 130. For example, Enterprise 130 may provide a predetermined monetary reward for each customer service inquiry resolved by experts via Expert Management System 105. Enterprise 130 may specify a budget for resolving customer service inquiry and Reward Logic 180 may be configured to provide rewards to experts based on this budget. The amounts of rewards received by experts is optionally dependent on the rating of the response by the requester and/or other experts, dependent on the topic characteristics of the inquiry, on the amount of time and/or number of experts that contributed to the response, on the score of the expert, on the response time of the expert, on whether the customer service was forwarded (and whom it was forwarded to), on contact center capacity and utilization, on time of day, on time of year, etc. In some embodiments, Reward Logic 180 is configured to split rewards between collaborating experts. An expert may share in a reward as a result of a referral and/or collaboration. Thus, an expert may be entitled to a reward for any contribution to the workflow related to customer service inquiries, or similar tasks. In an illustrative embodiment, an external expert may be rewarded for modifying and/or merely approving draft answers for used by Automated Response Logic 190. Reward Logic 180 is typically configured to track relative contributions of individual experts to an automated response, and to track performance (use and scoring) of the automated response. Examples of agent contributions include wording of complete and/or partial responses and tasks that contribute explicitly and/or implicitly to the training of a neural network/machine learning system/artificial intelligence system that serves automated responses, such as rating and reviewing past interactions between users and the automated responses, reviewing and approving clusters of frequently asked questions suggested by the machine learning/artificial intelligence system, etc.

In some embodiments, Reward Logic 180 is configured to provide a reward specified by the source of a customer service inquiry. For example, a requester may designate a reward amount prior to the inquiry being routed to an expert or may designate, after the inquiry is resolved, a reward (tip) to be paid to the expert that resolved the inquiry by providing a satisfactory answer. In some embodiments, experts can bid to receive customer service inquiries, the result of the bidding being based on the lowest bid and/or the experts' scores. For example, the expert willing to be paid the lowest amount (as normalized by expert score) to resolve the inquiry is considered the bidding winner. The winner of the bidding, as determined by Reward Logic 180, receives the customer service inquiry.

Reward Logic 180 is optionally configured to provided rewards related to Automated Response Logic 190. In various embodiment, these rewards are provided when an external expert's answer is used to train an artificial intelligence system (or other type of machine learning system), and/or when content from the external expert's answer is reused by Automated Response Logic 190. For example, if a response receives a particularly high score (as determined by Scoring Logic 160) then that response may be used to train a machine learning system included in Automated Response Logic 190. Such use may justify that a reward be provided to the human expert that first generated the response. Rewards can include publicity, cash, credits, non-profit donations, and/or any other consideration. Rewards may be provided for tasks that contribute explicitly and/or implicitly to training of the neural network/machine learning system/ artificial intelligence system. Also, Reward Logic 180 may distribute these rewards based on experts' relative contribution to performance of automated responses.

In some embodiments, Expert Management System 105 further comprises a Response Log Storage 185. Response Log Storage 185 includes non-transitory memory specifically configured to store responses to customer service inquiries, including responses provided by experts. The memory is thus configured via data and file structures. For example, Response Log Storage 185 can include a relational database including data records configured to store responses in a chronological order. The data records may be configured to store a conversation between a requester and one or more expert wherein each party provides content in the form or audio, text and/or video.

In some embodiments, some or all responses stored in Response Log Storage 185 are available to a requester on a historical basis, e.g., the requester can review a history of responses provided to the requester and/or responses provided to other requesters. In some embodiments some or all responses stored in Response Log Storage 185 are available to experts, other than the experts that provided the responses. For example, responses may be made available to experts for the purpose of rating the responses, and/or to facilitate the use of the stored responses to respond to further customer service inquiries. In some embodiments, an expert may be rewarded (e.g., given a higher score) for providing a response that is used by other experts to resolve other customer service inquiries. In some embodiments, responses stored in Response Log Storage 185 are provided to Enterprise 130 such that Enterprise 130 can improve the knowledge base used by Contact Center 125.

Expert Management System 105 optionally further includes Acceptance Logic 157. Acceptance Logic 167 is configured to accept a subset of received customer service inquires for processing by one or more external experts and/or by Automated Response Logic 190, e.g., by a first human expert and a trained machine learning system. The acceptance may be based on availability of the first human expert and predicted probabilities that the first human expert will be able to resolve each member of the subset of inquiries. Typically, Acceptance Logic 167 is configured to consider the probabilities that any one or combination multiple external human experts will be able to resolve each customer service inquiry. Resolution of a customer service inquiry may require a predicted response score of a predetermined level.

The probability that a customer service inquiry can be resolved is optionally determined in real-time as customer service inquiries are received. In some embodiments, Acceptance Logic 157 is configured to compare an estimated probability of resolution for each of the inquires to a threshold probability. Customer service inquiries that are not accepted are optionally directed to Contact Center 125.

Expert Management System 105 optionally further includes Training Logic 147. Training Logic 147 is configured to train an artificial intelligence system and/or other machine learning systems, including those that are optionally included in Automated Response Logic 190, Acceptance Logic 157, Specialty Discovery Logic 187, Matching Logic 155, Inquiry Parser 140, and/or Routing Logic 165. Training Logic 147 is configured to train these machine learning systems based on customer service inquiries, responses to these customer service inquiries, and/or scores generated using Scoring Logic 160 and associated with respective member if the responses.

In some embodiments Expert Management System 105 further comprises Specialty Discovery Logic 187. Specialty Discovery Logic 187 is configured to identify one or more specialty characteristics of experts using Expert Devices 115. The identified specialties are optionally in addition to specialties that are self-declared by each expert. The identification is based on customer service inquiries answered by each of the experts and/or based on answers to the customer service inquiries provided by each of the experts. Matching Logic 155 is optionally further configured to match an inquiry to a human expert based on specialties identified by Specialty Discovery Logic 187 (optionally in addition to considering expert scores). Specialty Discovery Logic 187 includes hardware, firmware, and/or software store on a non-transient computer readable medium. In some embodiments Specialty Discovery Logic 187 includes a trained machine learning system. This machine learning system is optionally trained using customer service inquiries, responses generated by human experts (and/or automated response logic), and/or response scores produced by Scoring Logic 160.

In some embodiments, Specialty Discovery Logic 187 is configured to parse answers provided by an expert and to note topics included in these answers. For example, if an expert provides a number of answers that include discussion of wireless networks, the Specialty Discovery Logic 187 may identify wireless networks as a specialty of that expert. Specialty Discovery Logic 187 may take into account reviews (e.g., scores) of an expert's answers. For example, if an expert receives good (e.g., highly rated) reviews for answers related to cable television service, then Specialty Discovery Logic 187 may identify cable television as a specialty of that expert. Likewise, if an expert receives poor reviews for answers related to mountain bikes then the expert may not be considered to have a specialty on this subject, even if the expert attempts to self-declare expertise in the subject. The reviews may be from customers and/or other experts.

In some embodiments, expert's answers to customer service inquiries and/or expert's comments are placed in a FAQ bulletin board or discussion board. In these embodiments, voting (up or down) of an expert's answer and/or comment may be used in determining specialties of an expert. A specialty of an expert may or may not be a Boolean value. For example, expertise can be on a scale from −5 to +10.

In some embodiments Specialty Discovery Logic 187 is configured to parse customer service inquires answered by an expert and to note topics included in these inquiries. For example, if an expert frequently chooses to answer inquires relating to automotive repair then Specialty Discovery Logic 187 may determine that the expert has a specialty in the field of automotive repair. Specialty Discovery Logic 187 may consider both the content of inquiries answered the content of the resulting answers.

In some embodiments, Specialty Discovery Logic 187 includes a Natural Language Processing (NLP) and/or Natural Language Understanding (NLU) system configured to identify topics of answers and inquires. Alternatively, Inquiry Parser 140 may be used to identify these topics. In some embodiments, Specialty Discovery Logic 187 is configured to identify specific terms in requests and/or answers. The specific terms may be predetermined or may be determined by analysis of many answers and/or requests, and noting that identified specific terms and/or specialties can be used to classify experts and inquires.

In some embodiments, Expert Management System 105 further comprises Automated Response Logic 190. Automated Response Logic 190 includes hardware, firmware and/or software statically stored on a computer readable medium. Automated Response Logic 190 is configured to generate an automated response to a customer service inquiry. As used herein, an "automated response" is a response that is generated automatically by computer, e.g., without a need for real-time human input. Typically, an automated response is provided as an attempt to resolve a customer service inquiry prior to forwarding the inquiry to a human expert. For example, Routing Logic 165 may be configured to route a customer service inquiry to one of Expert Devices 115 only if the automated response does not satisfy the requester of the customer service inquiry.

As noted herein, Automated Response Logic 190 optionally includes an artificial intelligence, neural network, expert system, or other machine learning system. These systems are configured to provide complete and/or partial responses to customer service inquiries based on trained parameters. For example, a machine learning system may be trained to generate coefficients that optimize a desired outcome using training data. In typical embodiments, one desired outcome is responses that result in high scores as determined using Scoring Logic 160. Another possible desired outcome is efficient (e.g., cost effective) use of human experts and computing resources. Training data provided to Training Logic 147 to train machine learning system(s) of Automated Response Logic 190 (or any other logic discussed herein) is optionally selected based on response scores. For example, responses produced by human experts may be divided into subsets having relative higher and lower scores. Those with higher scores typically represent preferred (or affirmative) training data. Those with lower scores may represent negative training data, e.g., training data that represents a less desirable outcome.

Automated Response Logic 190 is optionally configured to participate in a joint chat session that includes a customer and one or more human experts. Automated Response Logic 190 may provide initial responses to a customer support inquiry and a human expert may add to these responses in the same chat session. Or Automated Response Logic 190 may join a chat session in which a human expert has already provided response text. In such embodiments, Automated Response Logic 190 may be configured to analyze both text provided to the chat session by the customer and also text provided one or more human experts, responses provided by Automated Response Logic 190 being responsive to this analysis. Thus, the human experts may provide text that improves the precision and accuracy of automated responses generated by Automated Response Logic 190. The improvement is optionally measured by scores of the automated responses for training purposes, etc.

The automated response is based on the topic characteristics of the inquiry and includes a pre-determined answer to the inquiry or an answer at least partially constructed in response to the inquiry in real-time. The pre-determined answer to the inquiry optionally includes a re-purposed answer previously provided by an expert to an inquiry from a different source and/or an output of a computer based expert system included in Automated Response Logic 190. In some embodiments, an expert can modify the answer to better answer the customer service inquiry, prior to the answer being sent to the requester. In some embodiments, an automated response is sent to a requester while waiting for one or more expert to provide a manual answer. The one or more expert may modify and/or augment the automated response.

In some embodiments, responses provided by Automated Response Logic 190 are rated in manners similar to those described regarding response provided by experts, as discussed elsewhere herein. As such, an automated response can receive a score that is subsequently used to determine if the automated response should be sent in response to a customer service inquiry. This score is optionally specific to one or more topic characteristics. Scores for automated responses are optionally calculated by Scoring Logic 160 using the systems and methods described elsewhere herein.

FIG. 2 illustrates a method of processing a customer service inquiry, according to various embodiments of the invention. These methods are optionally performed using Expert Management System 105. When a stream of customer service inquires is received from Client Devices 110 the methods of FIG. 2 may be used to determine which of the inquiries should be accepted and processed by Expert Management System 105 and which are better resolved at Contact Center 125 (optionally under control of Enterprise 130).

In a Monitor Status Step 210 the status of a plurality of human experts is monitored. This step is optionally performed using Status Logic 145. The status can include whether a particular human expert is connected to Expert Management System 105 via one of Expert Devices 115, whether the expert is currently engaged in responding to customer service inquiries, the specialty characteristics of available internal and external experts, and/or the like.

In a Receive Stream Step 215 a stream of customer service inquiries is received. These are typically received from Client Devices 110 via Network 120. In some embodiments, some of the customer service inquiries are received from Enterprise 130 and/or Contact Center 125.

In an optional Parse Step 220 each member of the customer service inquiries is parsed. Typically, the parsing is performed using Inquiry Parser 140. The parsing is configured to determine one or more topic characteristics for each of the customer service inquires. The parsing may also be used to identify metadata associated with the customer service inquires.

In an optional Retrieve Step 225 data regarding each of the plurality of experts is retrieved from data storage. The retrieved data can include specialty characteristics, expected rewards, location, communication bandwidth, expert scores, and/or the like, regarding each of the plurality of experts.

In a Calculate Step 230 a probability that each (or any) of the plurality of experts can resolve each of the customer services inquires is calculated. The calculation is optionally based on the topic characteristics of each inquiry, the specialty characteristics of each of the plurality of experts, and/or other data related to the human experts. In some embodiments, Calculate Step 230 includes a calculation of a probability that an automated response system, e.g., Automated Response Logic 190, will be able to answer each of the customer service inquires, respectively.

In an Accept Step 235, a subset of the plurality of inquiries is accepted. In some embodiments, the subset is selected by comparing 1) a threshold and 2) the calculated probability of each inquiry being resolved by a human expert (e.g., by members of the plurality of experts). In other embodiments, the subset is selected by comparing 1) a threshold and 2) the calculated probability of each inquiry being resolved by Automated Response Logic 190 (or some other automated response system). A machine learning system, included within Acceptance Logic 157, may be applied to each customer service inquiry and data characterizing members of the plurality of experts retrieved in Retrieve Step 225. Accept Step 235 is optionally performed using Acceptance Logic 157.

In a Route Step 240 each member of the subset accepted in Accept Step 235 is routed to at least one of the plurality of experts and/or automatic response logic, e.g., Automated Response Logic 190. Route Step 240 is optionally performed using Routing Logic 165, as discussed elsewhere herein. Routing Logic 165 may use a trained machine learning system for this purpose.

In an optional Receive Response Step 245, a response to one or more members of the subset of the plurality of inquiries is received. The response may be a complete response or a partial response. For example, the response may be a complete response that is ready to be provided to a requester; or the response may be a partial response including content received from one or more of the plurality of experts and/or received from Automated Response Logic 190. Complete responses may be automatically communicated to a requester. As is discussed elsewhere herein, a response may include contributions from both human expert and automated systems. A human expert may modify a partial response provide by an automated system. Completed responses are optionally sent directly to request sources, e.g., sent to Enterprise 130, Contact Center 125, and/or members of Client Devices 110. Partial responses are not typically sent directly to Client Devices 110, although they may be sent to Enterprise 130 and/or Contact Centers 125 for modification and/or approval.

In an optional Score Response Step 250, the response received in Response Step 245 is scored using Scoring Logic 160. The scoring can be based on any of the criteria discussed herein with regard to Scoring Logic 160. In some embodiments, separate scores are calculated for contributions of different human experts and/or Automated Response Logic 190. Both human and/or automated contributions to a response may be scored. The scores are typically intended to be a measure of a quality of the response.

In an optional Reward Step 255, a reward is provided to one or more of the plurality of experts. The reward is compensation for contributing to a response to one of the subset of customer service inquires. The reward is optionally a financial reward. The reward may be for contributing all or part of a response. More than one of the plurality of experts may receive a reward for contributing to the same response. In some embodiments, the reward is made for a contribution to response content that is later provided by Automated Response Logic 190. For example, a first human expert may contribute to a response to a first customer service inquiry. The first human user can receive a reward for this contribution, e.g., based on a good score etc. That contribution can then be incorporated in a response stored in Automated Response Data 195 for later use by Automated Response Logic 190. When the stored response is later used (again) by Automated Response Logic 190, the first human expert can then receive an additional reward for the later use of the contribution. The first human expert can receive repeated rewards (2 or more) for a contribution that is used repeatedly (2 or more times) to respond to customer service inquiries from different sources, e.g., different members of Client Devices 110.

FIG. 3 illustrates a method of automatically processing a customer service inquiry, according to various embodiments of the invention. The methods illustrated optionally include a combination of human agents and automated response systems. For example, they may use Automated Response Logic 190 as well as internal and/or external agents at Expert Devices 115. The methods optionally makes use of multiple machine learning systems and these machine learning systems may be trained using scored responses to customer service inquiries.

In a Receive Inquiries Step 310 a plurality of customer service inquiries is received by Expert Management System 105. These inquiries may be received from Client Devices 110, Enterprise 130, and/or Contact Center 125. Receive Inquires Step 310 is optionally an embodiment of Receive Stream Step 215.

In a Provide Responses Step 315, responses to the customer services inquires received in Receive Inquiries Step 310 are provided. The Responses are typically provided to the sources of the respective requests. The responses provided are optionally generated using a plurality of internal and/or external human experts, as described elsewhere herein. Provide Responses Step 315 optionally includes Steps 215-240 and/or 245 as discussed with respect to FIG. 2.

In a Score Step 320, a score is generated for each of the responses provided in Provide Responses Step 315. This score may be generated using Scoring Logic 160 and is typically intended to represent a measure of the quality of each of the responses.

In an optional Select Step 325, the scored responses are divided into two or more subsets based on their score. For example, Training Logic 147 may be used to select a first subset including the top quartile of the scores and a second subset including the bottom quartile of the scores. This first subset is associated with higher scores relative to the second subset of responses. Different subsets may be selected.

In a Train Step 330, a first machine learning system is trained using Training Logic 147.

In a Provide Step 335, a first customer service inquiry is received by Expert Management System 105 and provided to the first machine learning system. This customer service inquiry is typically not a member of the customer services inquiries received in Receive Inquiries Step 310.

In a Generate Step 340, a partial response or complete response to the first customer service inquiry is generated.

In an optional Complete Step 345, a partial response generated using the trained machine learning system in Generate Step 340 is used to generate a complete response to the first consumer service inquiry.

In an optional Provide Step 350, the complete response to the first customer service inquiry is provided, typically to a source of the first customer service inquiry.

In an optional Score Response Step 353, a score is generated for the complete response to the first machine learning system provided in Provide Step 350. As in Score Step 320, the score is typically generated using Scoring Logic 160. This score is for a response that includes a contribution of the first machine learning system, generated in Generate Step 340. Score Response Step 353 is optionally an embodiment of Score Response Step 250.

In an optional Train Step 355, a second machine learning system is trained using the first customer service inquiry, the response provided in Provide Step 350, and/or the score generated in Score Response Step 353. Note that an output of the first machine learning system is used to train the second machine learning system. The second machine learning system may be part of machine learning systems taught herein to be part of Routing Logic 165, Acceptance Logic 157, and/or Specialty Discovery Logic 187.

In a Receive Step 360, a second customer service inquiry is received at Expert Management System 105. This inquiry may be different from the first customer service inquiry. The second customer service inquiry may be from Enterprise 130, Contact Center 125 or members of Client Devices 110.

In a Determine Step 365, the second machine learning system is optionally used to determine if the second customer service inquiry should be provided to the first machine learning system for generation of at least a partial response to the second customer service inquiry. For example, once trained the second machine learning system may be used to determine acceptance and/or routing of additional customer service inquires. Alternatively, in Determine Step 365, the second machine learning system is used to determine specialty characteristics of human experts, e.g., as part of Specialty Discovery Logic 187.

In summary, the method illustrated in FIG. 3 involves processing customer service inquires using human experts, evaluating the responses provide by the human experts and then using the inquiries, responses and evaluations to train a first machine learning system. The first machine learning system being configured to generate partial or complete responses to additional customer service inquiries. The responses generated by the first machine learning system (with optional further human contribution) may then be scored, and these responses and scores used to train a second machine learning system. The second machine learning system may be configured for accepting customer service inquiries, routing customer service inquiries, determine expert specialty characteristics, and/or the like.

In alternative embodiments, the machine learning system (e.g., artificial neural network or artificial intelligence system) configured for accepting customer service inquiries, routing customer service inquiries, or determine expert specialty characteristics, etc. is trained based on scored responses to customer service inquiries that are solely generated by human experts. In these cases, the second machine learning system does not require training data (e.g., scored requests) that include contributions from the first machine learning system. As such Steps 310-330 of FIG. 3 are optional.

Figure 4:
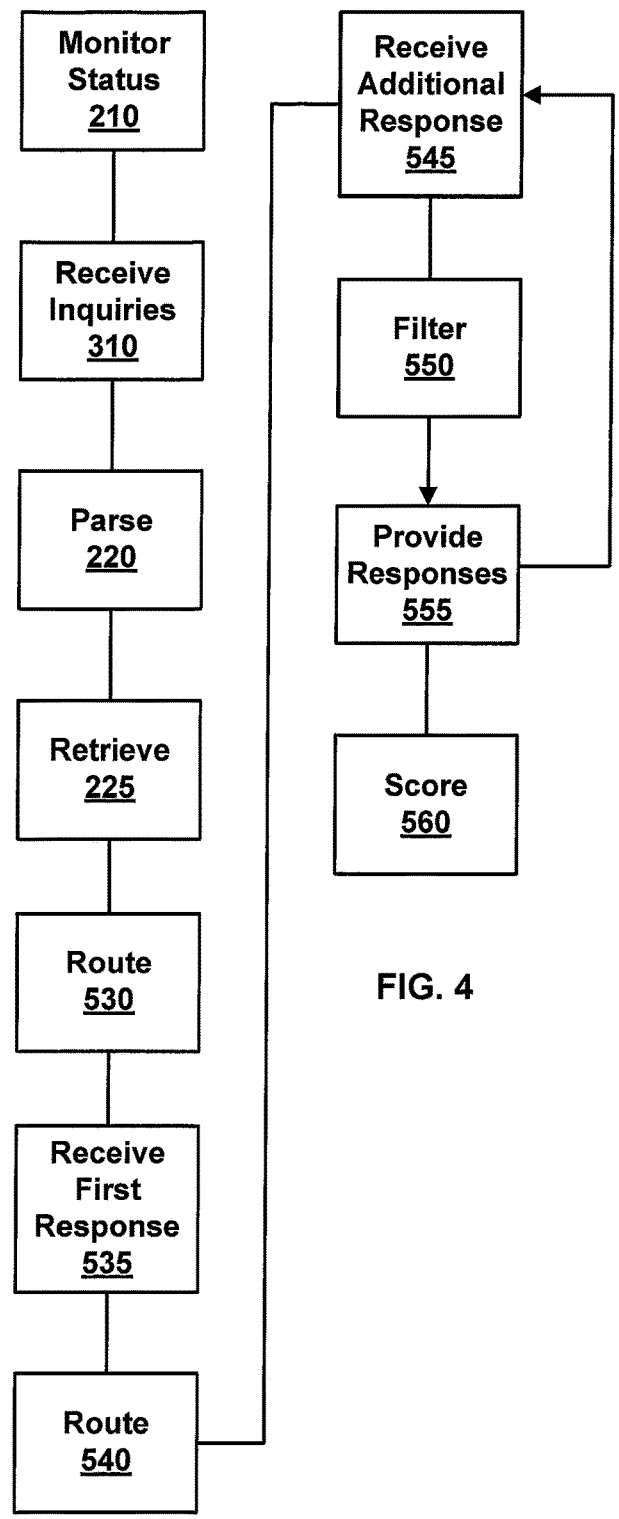
FIG. 4 illustrates methods of managing communication between a customer and more than one response source, according to various embodiments of the invention.

FIG. 4 illustrates methods of managing communication between a customer and more than one response source, according to various embodiments of the invention. The more than one response source can include multiple human experts and/or Automated Response Logic 190. The communication is optionally performed within a group chat window and/or as part of a single chat session. For example, communication between a customer and multiple response sources may occur using one or more chat window managed by Communication Logic 175.

In optional Monitor Status Step 210 the status of a plurality of human experts is monitored, as describe elsewhere herein. In a Receive Inquiries Step 310 at least one customer service inquiry is received from a customer, as described elsewhere herein. The customer service inquiry is optionally one of a plurality of customer service inquiries received from different sources, e.g., Client Device 110A, Client Device 110B, and/or Contact Center 125. In an optional Parse Step 220 the at least one customer service inquiry is parsed to determine a subject matter (e.g., topic) of the customer service inquiry, as described elsewhere herein.

In an optional Retrieve Step 225 characteristics of at least one human expert are retrieved, as described elsewhere herein. The retrieved information optionally includes information regarding which human experts have worked together to resolve customer service inquiries in the past.

In a Route Step 530 the customer service inquiry is routed to a first response source. The first response source may be a human expert or an automated response system, such as Automated Response Logic 190. Route Step 530 is optionally facilitated by Matching Logic 155. Route Step 530 is optionally an embodiment of Route Step 240 and may be performed using Routing Logic 165, as described elsewhere herein.

In a Receive $1^{st}$ Response Step 535 a response to the customer service inquiry is received from the first response source to which the customer service inquiry is routed in Route Step 530. The response can include text, video, and/or still images. The response received in Response Step 535 is optionally preceded by a human expert claiming rights to respond to the customer service inquiry.

In a Route Step 540 the customer service inquiry is routed to a second response source. The second response source may be a human expert or an automated response system. In some embodiments both the first response source and the second response source are human experts. In this case, the routing is optionally dependent on a history of the human experts working together. Route Step 540 is optionally an embodiment of Route Step 240 and performed using Routing Logic 165, as described elsewhere herein. Route Step 540 may be initiated by the first response source, by the second response source, by an automated response source, or by the customer. In some embodiments, Route Step 530 and Route Step 540 are performed contemporaneously, e.g. at approximately the same time and before Response Step 535.

In a Receive Additional Response Step 545 a response to the customer service inquiry is received from the second response source or the first response source. The additional response may also be responsive to the response received in Receive $1^{st}$ Response Step 535, and/or any additional responses received in Receive Additional Response Step 545. Additional Response Step 545 is optionally preceded by revoking exclusive rights to respond to the customer service inquiry.

In an optional Filter Step 550 confidential information is removed from or masked in the responses received in Receive $1^{st}$ Response Step 535 and/or Receive Additional Response Step 545. Filter Step 550 is optionally performed using Filtering Logic 177. Different views of the responses are optionally filtered using different criteria to produce different results.

In a Provide Responses Step 555 the received responses are presented in the same chat window in a group chat. Provide Responses Step 555 is optionally performed in real-time as the responses are received from the different response sources. Thus, Provide Response Step 55 may occur between instances of Receive $1^{st}$ Response Step 535 and/or Receive Additional Response Step 545. Receive Additional Response Step 545, Filter Step 550, and/or Provide Responses Step 555 may be repeated as needed. Typically, the customer may provide additional input as text, video and/or still images to the chat session at any time. This additional input may be included or considered in the responses. Provide Responses Step 555 is optionally performed using Communication Logic 175.

Different parties to the group chat may receive different views of the text posted to the chat window. For example, some parties may receive filter views. Contributions of the customer or any of the response sources may be filtered as described elsewhere herein to create the different views. Specifically, an external human expert may receive a view with a social security number redacted while an internal human expert receives a view of the chat session that includes the social security number.

In an optional Score Step 560 a score is generated for the responses to the customer support inquiry. The score can be based on the first response and also any additional responses received from response sources during the chat session. The score is intended to represent the quality of the resolution of the customer service inquiry as discussed elsewhere herein. Score Step 560 is typically performed using Scoring Logic 160 and the resulting scores can be stored in association with the chat session and/or any participants in the chat session.

FIGS. 5A-5D illustrate communication threads including a customer and multiple response sources. These communication threads each represent part of a chat session and are optionally presented in a single Chat Window 610 using the systems and methods discussed elsewhere herein.

In FIG. 5A a customer service inquiry comprising "How do I configure an SSID" is received from a customer. This customer service inquiry may be received in Receive Inquiries Step 310, and is assigned to an "Expert A" who provides a response "Do you mean in the A300 Router?" The response may be added to the chat window using Receive First Response Step 535 and Provide Responses Step 550.

The customer then answers "yes." Following the customer's input an automated response system "AI" provides a substantive response to the customer service inquiry. The automated response system is able to base its response on the initial inquiry from the customer, the response of Expert A and the customer's input "Yes." The response from AI may either be automatically contributed by Automated Response Logic 190 by monitoring the prior content of the chat, or may be requested by Expert A.

In some embodiments, Expert A is given an opportunity to approve or select an automated response before the automated response is presented to the customer. For example, Expert A may be shown 2, 3 or more alternative automated responses and can then select one of the alternative automated response for communication to the customer.

In FIG. 5B the same customer service inquiry is received. Expert A provides a first response and the customer provides an acknowledgement. "Expert B" now provides an additional response to the chat session. The contribution of Expert B may be initiated by Expert B or may by requested by Expert A. In some embodiments the customer is able to give separate feedback on the contributions of Expert A and Expert B using Communication Logic 175 and Scoring Logic 160.

In FIG. 5C the same customer service inquiry is received. However, in this case, the first response is provided by AI (an automated response system such as Automated Response Logic 190). Following an acknowledgement by the customer, Expert A provides an additional response providing additional information about the customer support inquiry. The additional response may be prompted by AI, by Expert A or by the customer. For example, the customer may have activated a control requesting additional information, or may have given real-time feedback indicating that the first response was insufficient. In this example, the additional response can be a real-time response to real-time feedback in an attempt to improve the quality of the resolution of the customer service inquiry.

Figure 5D:
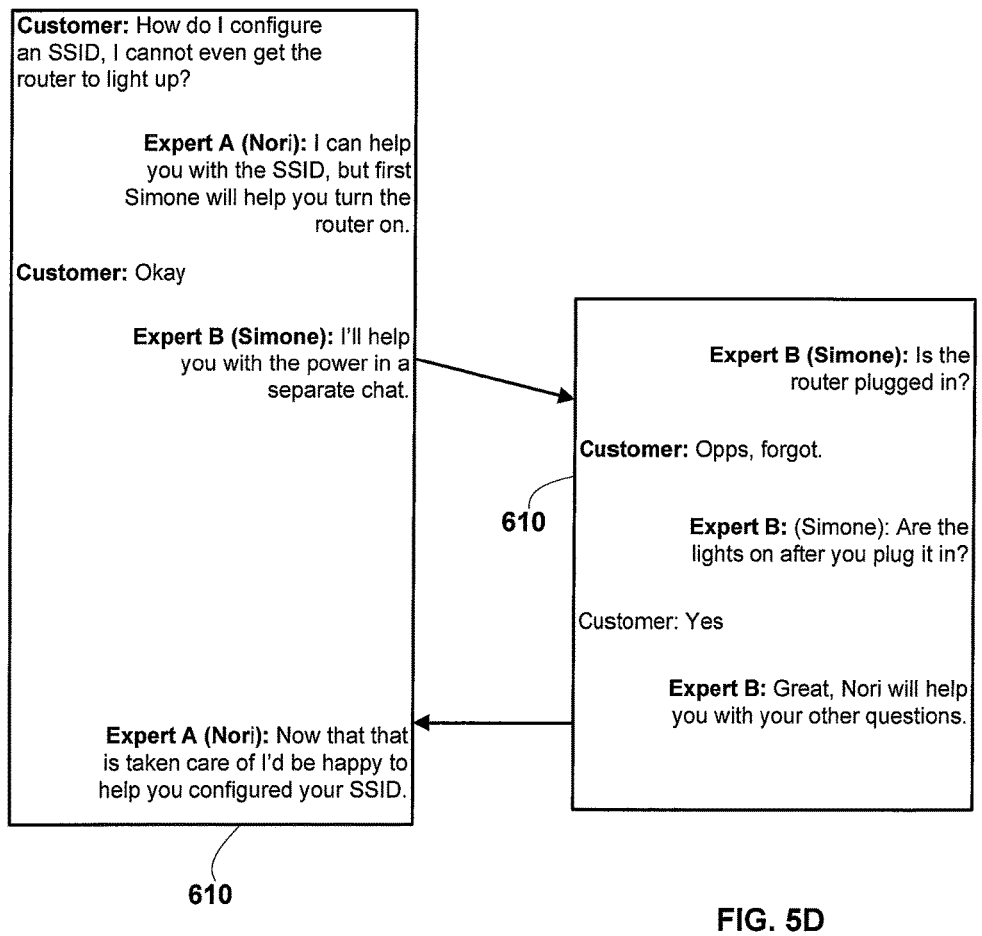

In FIG. 5D a customer service inquiry appears to include two issues, turning the router on and configuring the SSID. In this case Expert A indicates that she is able to solve one of the issues but first the other issue must be resolved. She informs the customer that the second issue will be resolved by Expert B. Expert B resolves the second issue in a separate Chat Window 610. This separate Chat Window 610 is optionally considered part of the same chat session because actions in one window can cause the second window to open or close. The use of a separate window allows Expert A to focus on other activities while the first issue is resolved. Once the first issue (plugging the router in) is resolved, the process is passed back to the first Chat Window 610 for further responses from Expert A.

FIG. 6 illustrates methods of managing communication between a customer and more than one human expert in a parallel mode, according to various embodiments of the invention. In these methods one or more human experts claim rights to respond to a customer service inquiry. Optionally, designated criteria must be satisfied before a second human expert is allowed to respond to the customer service inquiry. The customer is optionally provided with an opportunity to select a preferred response between responses provided by the first and second human experts. This selection may be used to score one or both of the responses.

Optional Monitor Status Step 210 is performed as discussed elsewhere herein. In Receive Inquiries Step 310 one or more customer service inquiries are received as discussed elsewhere herein. Parse Step 220, Retrieve Step 225 and Route Step 530 are performed as discussed elsewhere herein. In Route Step 530 a received customer service inquiry is routed to more than one human expert for consideration. For example the customer service inquiry may be sent to Expert Devices 115A, 115B and 115C. The human experts may review the customer service inquiry and "claim" it. Claiming the customer service inquiry serves as an indication that the human expert intends to provide a response to the customer service inquiry. In some embodiments, a human expert may only claim one customer service inquiry at a time. Often, if a first human expert claims the customer service inquiry before another human agent claims the request, the first human expert is given priority in answering the customer service inquiry.

In a Receive Claim Step 735 a claim to the customer service inquiry from a first of the human experts. For example, a human expert using Expert Device 115A may be first to claim rights to respond to the customer service inquiry. Receive Claim Step 735 may include receiving claims form several human experts.

In a Provide Rights Step 740 response rights are to the first of the human experts based on the received claim is provided. The response rights may or may not be exclusive. For example, in various embodiments, two, three or more human experts are given rights to respond to the customer service inquiry.

In a Receive first Response Step 535 a first response to the customer service inquiry from the first of the human experts is received. Note that if multiple human experts are given rights to respond to respond to the customer service inquiry, then multiple response may be received contemporaneously.

In a Provide Response Step 745 the first response is provided to the customer and optionally to a second of the human experts. For example, a response received from Expert Device 115A may be provided to Client Device 110A and also to Expert Device 115B. As such, a second human expert can review responses provided by a first human expert.

In an optional Receive Feedback Step 750 feedback regarding the first response, is received from the second of the human experts, from a third of the human experts, and/or from the customer. The feedback can be negative or positive and may be received from one or more sources, e.g., one or more human experts, and/or the customer.

In a receive Claim Step 755 a claim to respond to the customer support inquiry is received from the second of the human experts. This claim is an indication that the second of the human experts wishes to provide response to the customer service inquiry. Claim Step 755 is optionally contemporaneous with Claim Step 735.

In a Provide Rights Step 760 rights to respond to the inquiry are provided to the second human expert in response to the claim and the feedback. In some embodiments both the first and second human experts may simultaneously have rights to respond to the customer service inquiry. These rights may be granted at approximately the same time or rights may be granted to the second of the human experts only after Provide Response Step 745 and/or Receive Feedback Step 750.

In a Receive Additional Response Step 565 an additional response to the customer service inquiry is received from the second of the human experts. The additional response may be independent of the first response or may be configured to add to or clarify the first response. For example, the additional response may be provided as an alternative to the first response, or the additional response may include corrections or additions to the first response. Receive Additional Response Step 565 is optionally an embodiment of Receive Additional Response Step 545.

In a Provide Response Step 770 the additional response is provided to the customer, optionally the first human expert and optionally other human experts. Note that the first and additional responses are optionally provided to the customer at approximately the same time. For example, they may both be provided prior to Receive Feedback Step 750. In this case, Steps 755-765 may be performed in parallel with Steps 735, 740 and/or 535.

In an optional Receive Selection Step 775 a selection between the first response and the additional ($2^{nd}$, $3^{rd}$ or more) responses is received from the customer. The selection indicates a relative preference for the first response or the second response. For example, in some embodiments, the customer is shown two or three responses and asked which they believe best satisfies their customer service inquiry. The customer may be asked to rank the responses.

In an optional Score Step 780 the first and/or additional responses to the customer support inquiry are scored based, at least in part, on the relative preference or rank received in Receive Selection Step 775. The resulting score is optionally used to provide a reward to one of the human experts, e.g., using Reward Logic 180. As such, the human expert that provides the response preferred by the customer, may receive a reward for doing so.

FIG. 7 illustrates methods of managing communication between a customer and more than one human expert in a serial mode, according to various embodiments of the invention. The methods of FIG. 7 include an optional Receive Feedback Step 810 in which feedback regarding a response to a customer service inquiry is received. Receive Feedback Step 810 is optionally an embodiment of Receive Feedback Step 750.

The methods of FIG. 7 include an optional Receive Request Step 820 in which a request is received from a customer to replace the first human expert with a second human expert. The methods of FIG. 7 include an optional Receive Release Step 830 in which a release of the rights to respond to the customer service inquiry is received from the first human expert. The release is an acknowledgement that the first human expert is giving up his or her rights to respond further to the customer service inquiry.

The method of FIG. 7 includes a Revoke Step 840 in which the rights to respond to a customer service inquiry are revoked from a first human expert. Revoke Step 840 is optionally in response to any of the information received in Step 810, 820 and/or 830. For example, the rights to respond may be revoked in response to feedback received from one or more sources in Receive Feedback Step 810. Optionally, rights are revoked if a predetermined number of negative feedbacks are received. All rights to respond or just the exclusivity of the rights may be revoked.

Figure 8A:
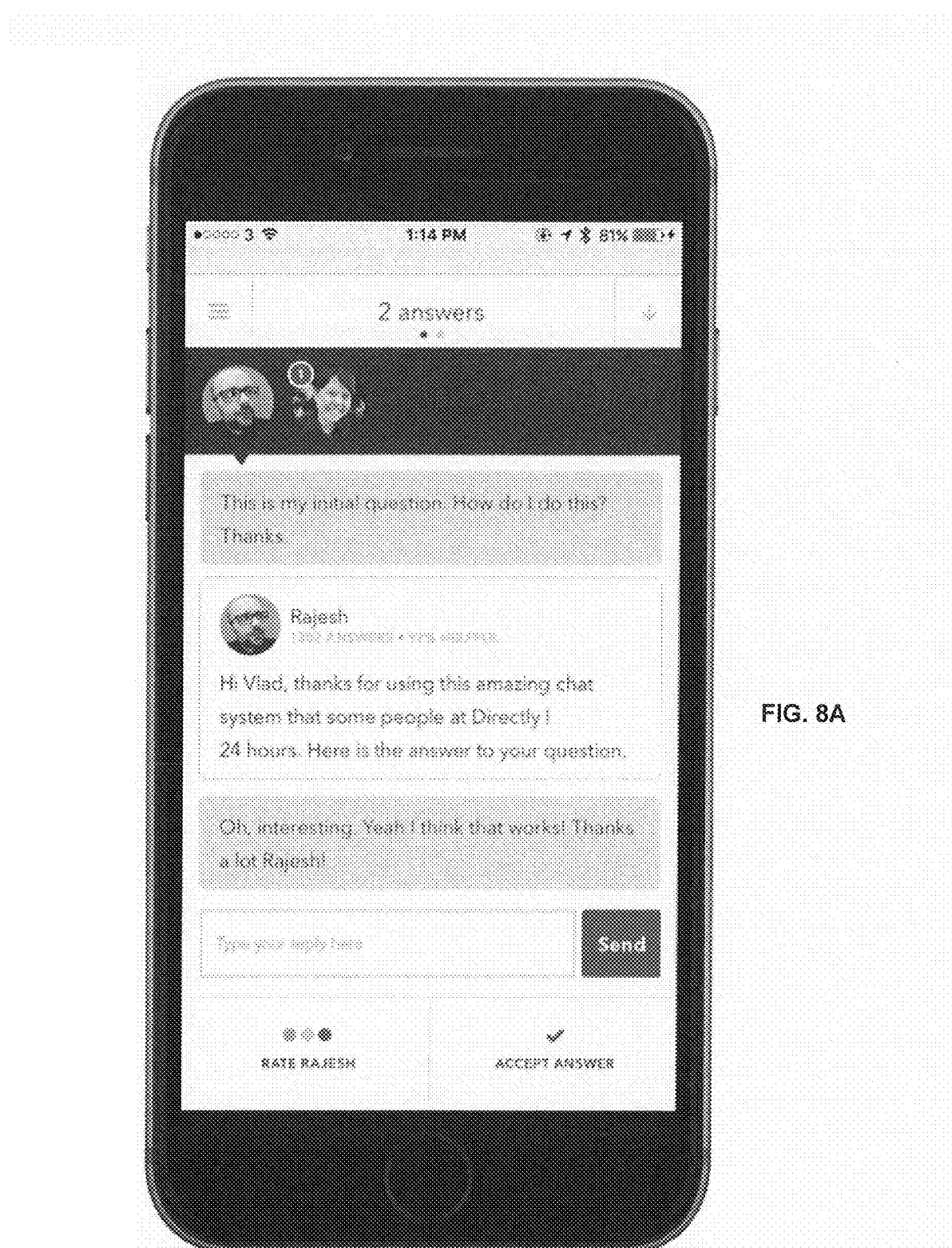
FIGS. 8A and 8B illustrate a customer interface in the parallel and serial modes respectively, according to various embodiments of the invention.
Figure 8B:
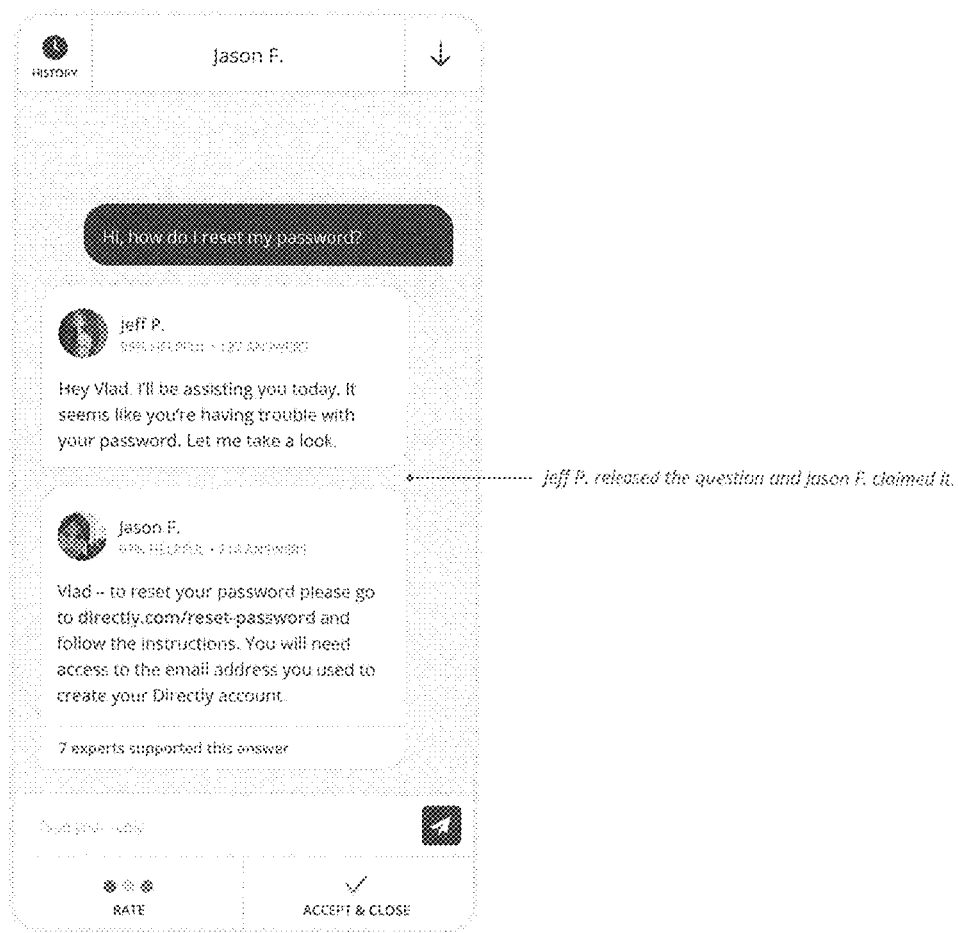

FIGS. 8A and 8B illustrate a customer interface in the parallel (8A) and serial (8B) modes respectively, according to various embodiments of the invention. In FIG. 8A two different responses to a customer service inquiry have been provided. The customer can toggle between the responses by clicking on the Images 910 of the respective human experts. In FIG. 8B a customer service inquiry was first responded to by a human expert "Jeff." Jeff released the question and then a human expert "Jason" claimed the inquiry and provided further response.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed at "customer" inquiries, the disclosed systems and methods may be applied to inquiries from entities other than customers. For example, business to business service inquiries or inquiries made to government entities. Likewise, while customer service inquiries are used as an example herein, the disclosed system and methods may be applied to various types of inquiries, e.g., inquiries for support, information, actions, sales, employment, service inquiries, and/or work requests (workflow). In some embodiments service inquiries are internal to an enterprise. For example, the systems and methods described herein may enhance communication within an enterprise or enterprise social network.

Further, while customer service is used as an example herein, the systems and methods described can easily be adapted to other tasks. For example, a community of external experts (and optional machine learning systems), may be used to approve expenses, approve advertisements, grade schoolwork, review applications (for jobs, permits, government programs, credit, licenses, grants, admission, insurance, loans, financial aid, etc.), approve advertisements, identify image contents, review content, classification, route work flow, complete forms, work completion, perform surveys, proofreading, and/or the like.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. An expert management system configured to manage customer service inquiries, the system comprising:
   a request I/O configured to receive a customer service inquiry from a customer;
   an inquiry parser configured to determine one or more topic characteristics of the inquiry;
   status logic configured to monitor statuses of a plurality of experts;
   expert data storage configured to store data characterizing one or more specialty characteristics of each of the plurality of experts;
   matching logic configured to match the inquiry to a first human expert and a second human expert of the plurality of human experts, the matching being based on a correlation between the topic characteristics of the inquiry and the specialty characteristics of the first and second human experts;
   communication logic configured to manage communication between the customer and both the first and second human experts; and
   routing logic configured to route the inquiry to the first human expert.

2. The system of claim 1, further comprising scoring logic configured to generate one or more expert score based on response ratings of responses to customer service inquiries provided by the first human expert, wherein the matching is further based on the one or more expert score of the first human expert.

3. The system of claim 2, wherein the scoring logic is configured to generate an expert score for a chat session including both the first and second human expert, based on feedback from the customer regarding the customer service inquiry.

4. The system of claim 1, wherein the communication logic is configured for the first human expert to add the second human expert to a communication session.

5. The system of claim 4, wherein the communication session is a chat session and the communication logic is further configured to provide a history of the chat session to the second human expert.

6. The system of claim 4, wherein the communication logic is configured for the first human expert to observe a chat session between the customer and the second human expert.

7. The system of claim 1, wherein the communication logic is configured for both the first and second human experts to participate in a chat session in parallel.

8. The system of claim 1, wherein the communication logic is further configured for both the first human expert and the second human expert to communicate with the customer via a same chat window.

9. The system of claim 1, wherein the communication logic is configured for the second human expert to respond to an answer provided by the first human expert.

10. The system of claim 1, wherein the communication logic is further configured for the first or second human expert to initiate a new chat window.

11. The system of claim 1, wherein the communication logic is configured to manage two parallel chat windows in response to the customer service inquiry.

12. The system of claim 1, wherein the communication logic is configured to allow more than one human expert to communicate with the customer regarding the customer service inquiry based on a topic of the customer service inquiry.

13. The system of claim 1, wherein the communication logic is configured to allow no more than three human experts to participate in the same chat channel to respond to the customer service inquiry.

14. A method of managing communication between a customer and more than one response source, the method comprising:
   receiving, using a request I/O, a customer service inquiry from the customer;
   parsing, using an inquiry parser, the customer service inquiry to determine a subject matter of the customer service inquiry;
   retrieving characteristics of at least one human expert from an expert data storage;
   routing, using routing logic, the customer service inquiry to a first response source;
   receiving a first response from the first response source;
   routing, using the routing logic, the customer service inquiry to a second response source;
   receiving a second response from the second response source; and
   providing the customer service inquiry, the first response and the second response to a same chat window, the chat window being visible to the customer.

15. The method of claim 14, further comprising monitoring status of a plurality of human experts, at least one of the first response source and the second response source being a human expert that is a member of the plurality of human experts, wherein routing the customer service inquiry to either the first response source or the second response source is responsive to the status of the at least one human expert.

16. The method of claim 14, further comprising generating a score based on both the first response and the second response, the score representing a quality of the responses.

17. The method of claim 16, wherein the score is based on a response generated by automated response logic.

18. The method of claim 16, wherein the score is based on feedback from the customer.

19. The method of claim 14, wherein the first response source is a human expert and the second response source includes an automated response logic.

20. The method of claim 14, wherein the first response source includes an automated response logic and the second response source is a human expert.

21. The method of claim 14, wherein the first response source includes a first human expert and the second response source includes a second human expert.

22. The method of claim 14, wherein the first response source includes a first human expert and the customer service inquiry is routed to the second response source based on input provided by the first human expert.

23. The method of claim 22, wherein the second response source is selected from a list of available human experts, by the first human expert.

24. The method of claim 14, wherein an ability to route the customer service inquiry to a second response source is dependent on a topic of the customer service inquiry.

25. The method of claim 14, wherein the first response source includes a human expert and the second response source includes automated response logic, the automated response logic being configured to analyze text provided by the human expert and the customer in order to select or generate an automated response to the customer service inquiry.

* * * * *